United States Patent
Hata et al.

(10) Patent No.: US 9,656,658 B2
(45) Date of Patent: May 23, 2017

(54) POWER TRANSMISSION DEVICE FOR HYBRID VEHICLE AND HYBRID SYSTEM

(71) Applicants: Kensei Hata, Susono (JP); Yuji Iwase, Mishima (JP); Seitaro Nobuyasu, Susono (JP)

(72) Inventors: Kensei Hata, Susono (JP); Yuji Iwase, Mishima (JP); Seitaro Nobuyasu, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 52 days.

(21) Appl. No.: 14/646,957

(22) PCT Filed: Nov. 26, 2012

(86) PCT No.: PCT/JP2012/080504
§ 371 (c)(1),
(2) Date: May 22, 2015

(87) PCT Pub. No.: WO2014/080527
PCT Pub. Date: May 30, 2014

(65) Prior Publication Data
US 2015/0298682 A1    Oct. 22, 2015

(51) Int. Cl.
*B60W 10/02*    (2006.01)
*B60W 10/06*    (2006.01)
(Continued)

(52) U.S. Cl.
CPC ............ *B60W 20/10* (2013.01); *B60K 6/387* (2013.01); *B60K 6/445* (2013.01); *B60W 10/02* (2013.01);
(Continued)

(58) Field of Classification Search
CPC ...... B60W 10/02; B60W 10/06; B60W 10/08; B60W 20/10; B60W 20/40
See application file for complete search history.

(56) References Cited

U.S. PATENT DOCUMENTS

| 5,788,006 A | 8/1998 | Yamaguchi |
| 7,081,060 B2 * | 7/2006 | Hata ............... B60K 6/40 180/65.235 |

(Continued)

FOREIGN PATENT DOCUMENTS

| EP | 1 223 067 A2 | 7/2002 |
| JP | 08 290721 | 11/1996 |

(Continued)

OTHER PUBLICATIONS

International Search Report Issued Dec. 18, 2012 in PCTJP12/080504 Filed Nov. 26, 2012.

*Primary Examiner* — Ramya Burgess
*Assistant Examiner* — David Morris
(74) *Attorney, Agent, or Firm* — Oblon, McClelland, Maier & Neustadt, L.L.P.

(57) ABSTRACT

A power transmission device for a hybrid vehicle includes: a power distribution mechanism including a plurality of rotation components; a friction engagement device which is interposed between the engine and the rotation component connected to the engine; and a control device which performs a stop control for the engine and a release control for the friction engagement device so as to cause the vehicle to travel only by the power of the second rotary machine and performs an engagement control for the friction engagement device while the vehicle travels only by the power of the second rotary machine so as to perform a push-start of the engine, and the control device controls the first rotary machine so that the friction engagement device is main- (Continued)

tained in a half engagement state at a differential rotation speed higher than a predetermined rotation speed during the push-start of the engine.

16 Claims, 12 Drawing Sheets

(51) Int. Cl.
| | |
|---|---|
| *B60W 10/08* | (2006.01) |
| *B60W 20/10* | (2016.01) |
| *B60K 6/445* | (2007.10) |
| *B60K 6/387* | (2007.10) |
| *B60W 20/40* | (2016.01) |
| *B60W 20/00* | (2016.01) |
| *F16H 3/72* | (2006.01) |
| *F16H 37/08* | (2006.01) |

(52) U.S. Cl.
CPC ............ *B60W 10/06* (2013.01); *B60W 10/08* (2013.01); *B60W 20/00* (2013.01); *B60W 20/40* (2013.01); *F16H 3/727* (2013.01); B60W 2520/10 (2013.01); B60W 2710/021 (2013.01); B60W 2710/081 (2013.01); B60Y 2300/49 (2013.01); F16H 2037/0866 (2013.01); F16H 2200/2007 (2013.01); Y02T 10/6239 (2013.01); Y02T 10/6286 (2013.01); Y10S 903/93 (2013.01)

(56) References Cited

U.S. PATENT DOCUMENTS

| | | | |
|---|---|---|---|
| 7,273,119 B2 * | 9/2007 | Tsuneyoshi | B60K 6/365 180/65.28 |
| 8,594,876 B2 | 11/2013 | Takami et al. | |
| 2002/0094898 A1 | 7/2002 | Hata et al. | |
| 2012/0244992 A1 | 9/2012 | Hisada et al. | |
| 2013/0253743 A1 * | 9/2013 | Maruyama | B60K 6/442 701/22 |
| 2013/0304296 A1 * | 11/2013 | Ueda | B60K 6/48 701/22 |
| 2014/0180522 A1 * | 6/2014 | Ideshio | B60K 6/48 701/22 |
| 2015/0073673 A1 * | 3/2015 | Hata | F16D 48/06 701/68 |
| 2015/0175151 A1 * | 6/2015 | Schmoll Genannt Eisenwerth | B60W 10/02 701/22 |
| 2016/0176396 A1 * | 6/2016 | Hata | B60W 10/02 701/22 |
| 2016/0229387 A1 * | 8/2016 | Hata | B60K 6/365 |

FOREIGN PATENT DOCUMENTS

| | | |
|---|---|---|
| JP | 08 295140 | 11/1996 |
| JP | 2010 111194 | 5/2010 |
| JP | 2012 201255 | 10/2012 |

* cited by examiner

FIG.3

| TRAVEL MODE | FRICTION CLUTCH |
|---|---|
| EV TRAVEL MODE IN NORMAL STATE | ○ |
| EV TRAVEL MODE IN CLUTCH RELEASE STATE | — |
| HV TRAVEL MODE | ○ |

POWER TRANSMISSION DEVICE FOR HYBRID VEHICLE AND HYBRID SYSTEM

FIELD

The present invention relates to a power transmission device for a hybrid vehicle that uses an engine and a rotary machine as power sources and a hybrid system.

BACKGROUND

Conventionally, there is known a power transmission device for a hybrid vehicle including an engine and a power distribution mechanism (a planetary gear mechanism) in which two rotary machines are connected. In a hybrid system including such a power transmission device, a rotation shaft of an engine, a rotation shaft of a first rotary machine, a rotation shaft of a second rotary machine, and a drive wheel are respectively connected to rotation components of the power distribution mechanism. Patent Literature 1 below discloses a structure in which an engine, a first electric generator, a second electric generator, and a drive wheel are respectively and individually connected to rotation components of a power distribution mechanism. In the hybrid system of Patent Literature 1, a friction clutch and a one-way clutch are interposed between the engine and the power distribution mechanism.

CITATION LIST

Patent Literature

Patent Literature 1: Japanese Patent Application Laid-open No. 8-295140

SUMMARY

Technical Problem

Incidentally, in such a hybrid system, the engine is stopped and the friction clutch is released in order to improve the fuel consumption and the electric consumption when the vehicle travels only by the power of the second electric generator or the first and second electric generators. For this reason, in the case where the stopped engine is started up in the travel state, the engine rotation speed is increased by the engagement of the friction clutch. Here, there is a case where the friction clutch becomes a complete engagement state when the differential rotation speed in the half engagement state is small during the start-up of the engine. Thus, in the hybrid system, a ripple torque which is generated in accordance with the start-up of the engine is transmitted to the power distribution mechanism through the friction clutch in the complete engagement state, and is transmitted to the output shaft (a ring gear shaft in Patent Literature 1) of the power distribution mechanism or the output shaft of the power transmission device on the side of the drive wheel. Accordingly, there is a possibility that noise or vibration may increase. For example, in order to suppress the transmission of the ripple torque, a method is considered in which a vibration damping control is performed by the control for the first electric generator or the second electric generator. However, the vibration damping control has a concern that the electric consumption or the fuel consumption may be degraded due to the use of the power of the secondary battery or the output torque of the first electric generator or the second electric generator may be degraded.

Therefore, the invention is made to solve the above-described problems of the related art, and an object thereof is to provide a power transmission device for a hybrid vehicle and a hybrid system capable of suppressing a problem caused by a ripple torque generated by the engagement of a friction clutch during the start-up of an engine.

Solution to Problem

To achieve the above-described object, a power transmission device for a hybrid vehicle according to the present invention includes: a power distribution mechanism which includes a plurality of rotation components rotating in different rotation speeds and in which a rotation shaft of an engine, a rotation shaft of a first rotary machine, a rotation shaft of a second rotary machine, and a drive wheel are respectively connected to four rotation components among the rotation components; a friction engagement device which is interposed between the engine and the rotation component connected to the engine; and a control device which performs a stop control for the engine and a release control for the friction engagement device so as to cause the vehicle to travel only by the power of the second rotary machine and performs an engagement control for the friction engagement device while the vehicle travels only by the power of the second rotary machine so as to perform a push-start of the engine, and the control device controls the first rotary machine so that the friction engagement device is maintained in a half engagement state at a differential rotation speed higher than a predetermined speed during the push-start of the engine.

Moreover, to achieve the above-described object, a hybrid system according to the present invention includes: an engine; a first rotary machine; a second rotary machine; a power distribution mechanism which includes a plurality of rotation components rotating in different rotation speeds and in which a rotation shaft of the engine, a rotation shaft of the first rotary machine, a rotation shaft of the second rotary machine, and a drive wheel are respectively connected to four rotation components among the rotation components; a friction engagement device which is interposed between the engine and the rotation component connected to the engine; and a control device which performs a stop control for the engine and a release control for the friction engagement device so as to cause the vehicle to travel only by the power of the second rotary machine, and performs an engagement control for the friction engagement device while the vehicle travels only by the power of the second rotary machine so as to perform a push-start of the engine, and the control device controls the first rotary machine so that the friction engagement device is maintained in a half engagement state at a differential rotation speed higher than a predetermined rotation speed during the push-start of the engine.

Moreover, it is preferable that, in the control for the first rotary machine during the push-start of the engine, the rotation speed of the first rotary machine is controlled in the normal rotation direction.

Moreover, it is preferable that, at a time a vehicle speed is equal to or higher than a predetermined vehicle speed during the push-start of the engine, the control device controls the friction engagement device in the half engagement state and controls the rotation speed of the first rotary machine in the reverse rotation direction, at a time the vehicle speed is lower than the predetermined vehicle speed during the push-start of the engine, the control device controls the friction engagement device in the half engagement state and controls the rotation speed of the first rotary machine in the normal rotation direction, and at a time the differential rotation speed of the friction engagement device decreases to the predetermined rotation speed after the control in the reverse rotation direction or the normal rotation direction, the control device controls the rotation speed of the first rotary machine in the normal rotation direction.

Moreover, it is preferable that the control device controls the first rotary machine at a target rotation speed of the first rotary machine in which the rotation speed of the rotation component connected to the engine becomes equal to or higher than an ignition permission rotation speed of the engine or a complete explosion rotation speed of the engine during the push-start of the engine.

Moreover, it is preferable that the target rotation speed of the first rotary machine increases as the vehicle speed increases in the reverse rotation direction at a time a vehicle speed is equal to or higher than a predetermined vehicle speed, and the target rotation speed of the first rotary machine increases as the vehicle speed decreases in the normal rotation direction at a time the vehicle speed is lower than the predetermined vehicle speed.

Moreover, it is preferable that the control device performs the control for the first rotary machine at least until the rotation speed of the engine increases to the ignition permission rotation speed of the engine or at least until a complete explosion of the engine.

Moreover, it is preferable that the power distribution mechanism includes first and second planetary gear devices of which ring gears connected to the drive wheel rotate together, the rotation shaft of the engine and the rotation shaft of the first rotary machine are respectively connected to a carrier and a sun gear of the first planetary gear device, and the rotation shaft of the second rotary machine is connected to a sun gear of the second planetary gear device.

Advantageous Effects of Invention

In the power transmission device for the hybrid vehicle and the hybrid system according to the invention, the friction engagement device is maintained in the half engagement state by the control for the first rotary machine at the same time of the push-start of the engine. For this reason, since the power transmission device and the hybrid system may suppress the ripple torque generated in the engine from being transmitted to the power transmission device through the friction engagement device at the same time of the push-start, noise or vibration may be suppressed. Further, in the power transmission device and the hybrid system, there is no need to perform the vibration damping control using the torque of the first rotary machine or the second rotary machine suppressing noise or vibration or it is possible to decrease the torque of the first rotary machine or the second rotary machine in the vibration damping control. Thus, the power transmission device and the hybrid system may improve electric consumption or fuel consumption and widen the EV travel application range using the torque of the second rotary machine.

BRIEF DESCRIPTION OF DRAWINGS

FIG. 3 is a diagram illustrating an operation engagement table of a friction clutch.

DESCRIPTION OF EMBODIMENTS

Hereinafter, an embodiment of a power transmission device for a hybrid vehicle and a hybrid system according to the invention will be described in detail with reference to the drawings. Furthermore, the invention is not limited to the embodiment.

[Embodiment]

An embodiment of the power transmission device for the hybrid vehicle and the hybrid system according to the invention will be described with reference to FIGS. 1 to 12.

Figure 1:
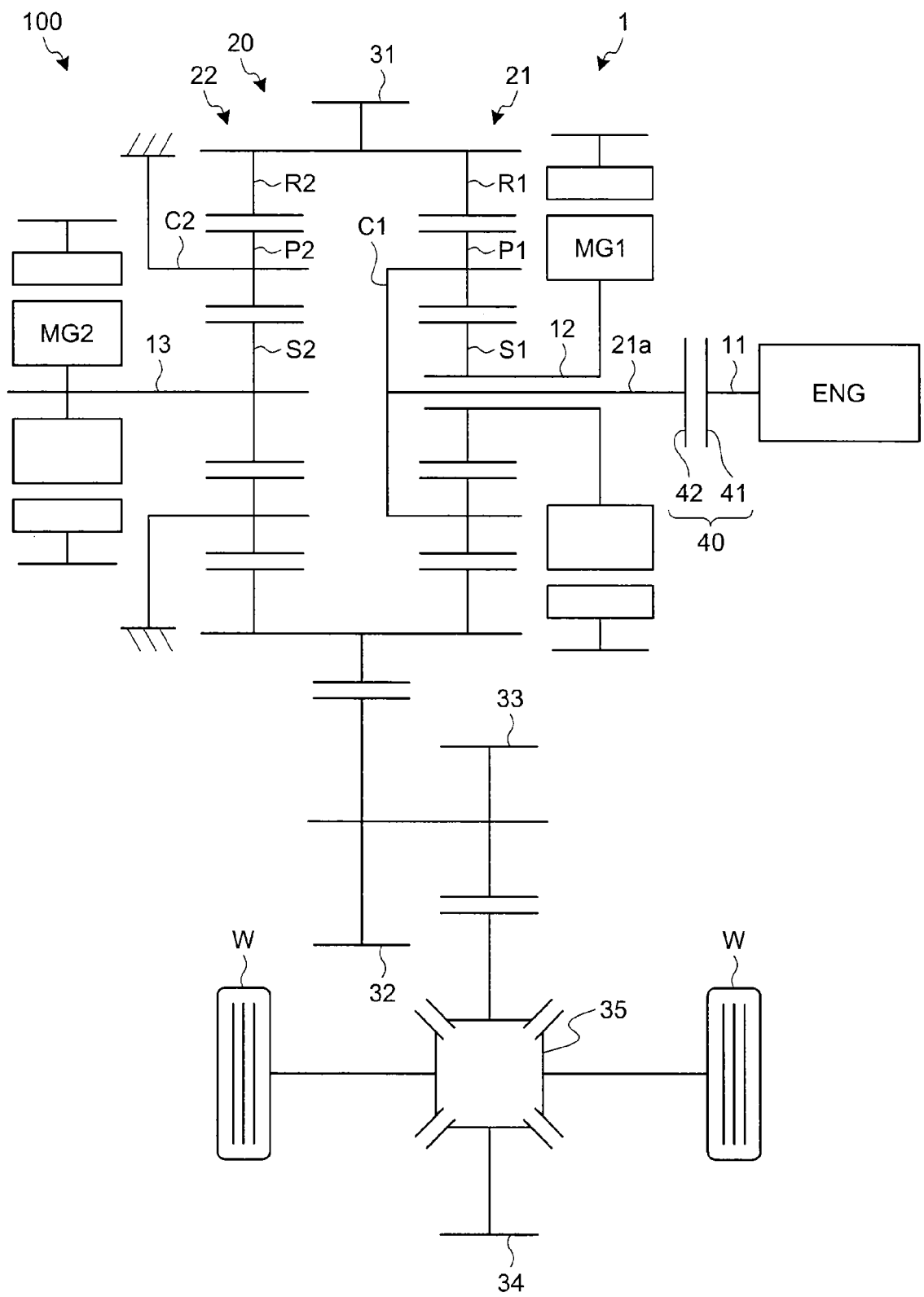
FIG. 1 is a skeleton diagram illustrating a configuration of a power transmission device for a hybrid vehicle and a hybrid system according to the invention.

A power transmission device 1 of the embodiment is illustrated in FIG. 1. Further, a hybrid system 100 including the power transmission device 1 is illustrated in FIG. 1.

The hybrid system 100 includes an engine ENG, a first rotary machine MG1, and a second rotary machine MG2 as a power source.

The engine ENG is an engine such as an internal-combustion engine or an external-combustion engine that outputs mechanical power (output torque) from an engine rotation shaft (a crank shaft) 11. The operation of the engine ENG is controlled by an electronic control device (hereinafter, referred to as "ENGECU") 51 as an engine control device illustrated in FIG. 2. The ENGECU 51 controls an output torque (hereinafter, referred to as an "engine torque") Te of the engine ENG through, for example, an opening degree control for an electronic throttle valve, an ignition control for an output of an ignition signal, and a fuel ejection control.

Each of the first rotary machine MG1 and the second rotary machine MG2 is an electric generator (motor/generator) which has a function as a motor in a power running drive state and a function as a generator in a regeneration drive state. The operations of the first and second rotary machines MG1 and MG2 are controlled by an electronic control device (hereinafter, referred to as an "MGECU") 52 as a rotary machine control device illustrated in FIG. 2. The first and second rotary machines MG1 and MG2 are connected to a secondary battery (not illustrated) through an inverter (not illustrated), and may convert the mechanical energy (the rotation torque) input to the rotation shafts (a MG1 rotation shaft 12 and a MG2 rotation shaft 13) into the electric energy so that the electric energy is charged in the secondary battery. Further, the first and second rotary machines MG1 and MG2 may convert the electric energy supplied from the secondary battery or the electric energy generated by the other rotary machines (the second and first rotary machines MG2 and MG1) into the mechanical energy (the rotation torque), and may output the mechanical power (the output torque) from the rotation shafts (the MG1 rotation shaft 12 and the MG2 rotation shaft 13). The MGECU 52 controls an output torque (hereinafter, referred to as an "MG1 torque") Tmg1 of the first rotary machine MG1 or an output torque (hereinafter, referred to as an "MG2 torque") Tmg2 of the second rotary machine MG2 by adjusting, for example, a current value for the first rotary machine MG1 or the second rotary machine MG2.

The hybrid system 100 is of a uniaxial type in which the engine rotation shaft 11, the MG1 rotation shaft 12, and the MG2 rotation shaft 13 are disposed concentrically. The power transmission device 1 is formed so that power may be transmitted between the power sources and power may be transmitted between each power source and the drive wheel W. For this reason, the power transmission device 1 includes a power distribution mechanism 20 in which the engine rotation shaft 11, the MG1 rotation shaft 12, and the MG2 rotation shaft 13 are respectively and individually connected.

The power distribution mechanism 20 includes a plurality of rotation components which may rotate differentially, and the engine rotation shaft 11, the MG1 rotation shaft 12, the MG2 rotation shaft 13, and the drive wheel W are connected to four rotation components among the rotation components. The power distribution mechanism 20 includes two differential devices (a first differential device 21 and a second differential device 22).

The first differential device 21 is a first planetary gear device which includes a sun gear S1, a pinion gear P1, a ring gear R1, and a carrier C1, and the engine ENG is connected to the first rotary machine MG1. In the configuration of this example, the engine ENG is connected to the carrier C1 through a friction clutch 40 to be described later, and the MG1 rotation shaft 12 of the first rotary machine MG1 is connected to the sun gear S1. The ring gear R1 is connected to the drive wheel W.

The second differential device 22 is a second planetary gear device which includes a sun gear S2, a pinion gear P2, a ring gear R2, and a carrier C2, and is connected to the second rotary machine MG2. In the configuration of this example, the MG2 rotation shaft 13 of the second rotary machine MG2 is connected to the sun gear S2. The ring gear R2 is connected to the drive wheel W. Further, the carrier C2 is connected to a vehicle body side (for example, a casing or the like of the power transmission device 1).

In the power distribution mechanism 20, the ring gears R1 and R2 of the first and second differential devices 21 and 22 rotate together. For example, in the power distribution mechanism 20, a tooth surface of the ring gear R1 is formed at one end side of the inner peripheral surface of the cylindrical member, and a tooth surface of the ring gear R2 is formed at the other end side of the inner peripheral surface thereof. The ring gears R1 and R2 further rotate along with a gear 31. A tooth surface of the gear 31 is formed on the outer peripheral surface of the cylindrical member.

In the power distribution mechanism 20, the ring gears R1 and R2 and the gear 31, that is, the cylindrical member becomes the output shaft. Thus, the power transmission device 1 is provided with a gear 32 which engages with the gear 31, a gear 33 which rotates along with the gear 32, a gear 34 which engages with the gear 33, and a differential device 35 which includes a casing with the gear 34. The drive wheel W is connected to the differential device 35.

The power transmission device 1 further includes the friction clutch 40. The friction clutch 40 is a friction engagement device which is interposed between the engine ENG and the rotation component (the carrier C1 of the first differential device 21) connected to the engine ENG. The friction clutch 40 includes a first engagement component 41 and a second engagement component 42. The first engagement component 41 is connected to the engine rotation shaft 11, and rotates along with the engine rotation shaft 11. Meanwhile, the second engagement component 42 is connected to a rotation shaft (a carrier shaft) 21a connected to the carrier C1, and rotates along with the carrier C1. The engagement operation and the release operation of the friction clutch 40 are controlled by an electronic control device (hereinafter, referred to as a "clutch ECU") 53 as a clutch control device illustrated in FIG. 2. The clutch ECU 53 controls the first engagement component 41 and the second engagement component 42 in an engagement state where a torque may be transmitted therebetween or a release state where a torque may not be transmitted therebetween. Here, the engagement state may be divided into a complete engagement state and a half engagement state. The complete engagement state indicates a state where the rotation of the first engagement component 41 is synchronized with the rotation of the second engagement component 42. The half engagement state indicates a state until the rotation of the first engagement component 41 and the rotation of the second engagement component 42 are synchronized with each other after both engagement components start to engage with each other and also indicates a state where a difference in rotation speed (that is, a slip) occurs between the first engagement component 41 and the second engagement component 42.

Figure 2:
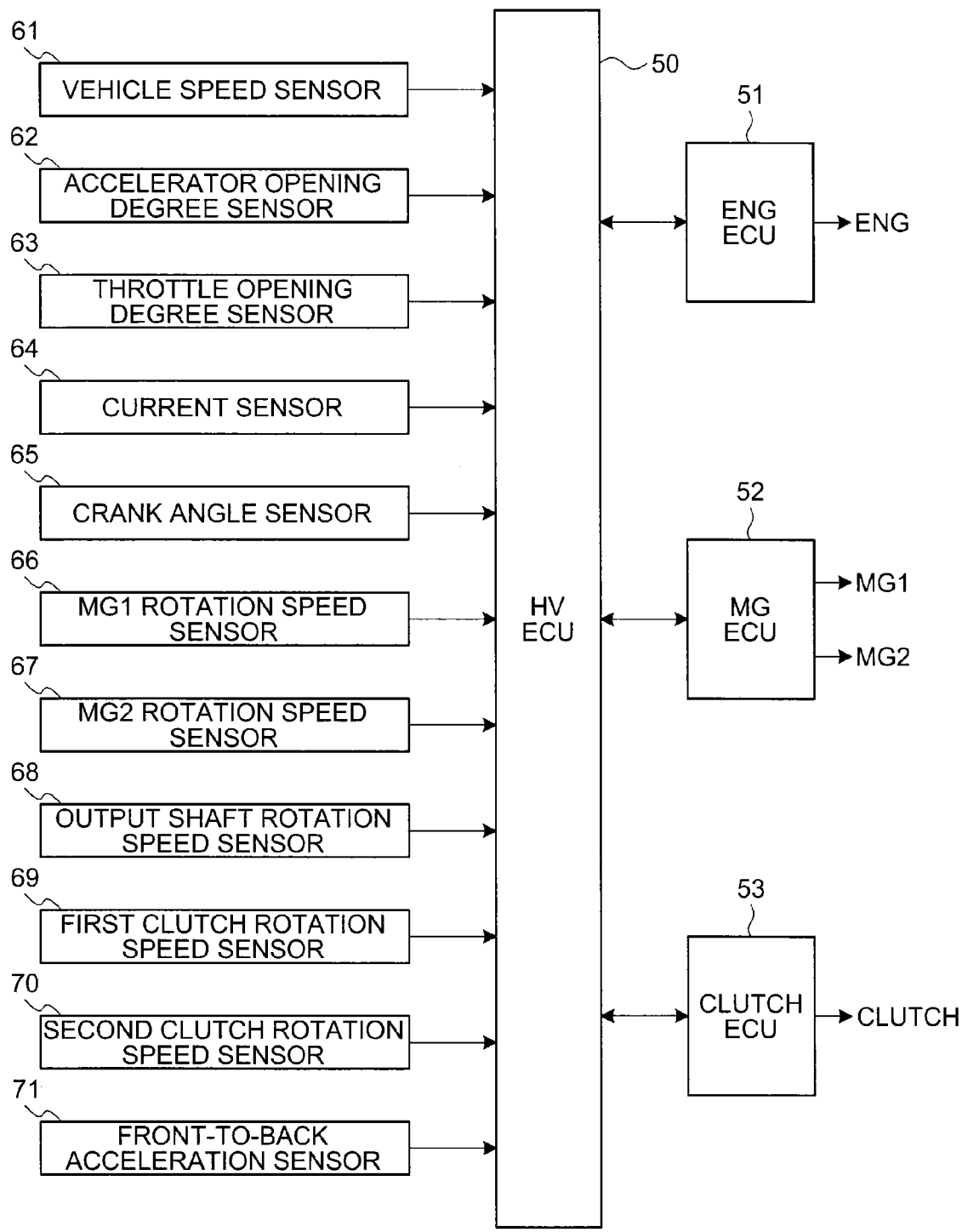
FIG. 2 is a diagram illustrating an input/output relation of a control device.

As illustrated in FIG. 2, the hybrid system 100 is provided with a general ECU (hereinafter, referred to as a "HVECU") 50 which generally controls the ENGECU 51, the MGECU 52, and the clutch ECU 53 and controls the entire system, and hence the control device of this system is configured by these components. The HVECU 50 controls the engine ENG through the ENGECU 51, controls the first rotary machine MG1 and the second rotary machine MG2 through the MGECU 52, and controls the friction clutch 40 through the clutch ECU 53.

A vehicle speed sensor 61, an accelerator opening degree sensor 62, a throttle opening degree sensor 63, and a current sensor 64 are connected to the HVECU 50. The HVECU 50 acquires a vehicle speed, an accelerator opening degree, a throttle opening degree, and an SOC (State of Charge) of the secondary battery by various sensors. Further, various sensors such as a crank angle sensor 65, an MG1 rotation speed sensor 66, an MG2 rotation speed sensor 67, an output shaft rotation speed sensor 68, a first clutch rotation speed sensor 69, a second clutch rotation speed sensor 70, and a front-to-back acceleration sensor 71 are connected to the HVECU 50. The HVECU 50 acquires a rotation speed (hereinafter, referred to as an "engine rotation speed") Ne of the engine ENG, a rotation speed (hereinafter, referred to as an "MG1 rotation speed") Nmg1 of the first rotary machine MG1, a rotation speed (hereinafter, referred to as an "MG2 rotation speed") Nmg2 of the second rotary machine MG2, a rotation speed of the output shaft (for example, the rotation shaft for the ring gears R1 and R2 and the gear 31) of the power transmission device 1, a rotation speed (hereinafter, referred to as a "first clutch rotation speed") Ncl1 of the first engagement component 41 of the friction clutch 40, a rotation speed (hereinafter, referred to as a "second clutch rotation speed") Ncl2 of the second engagement component 42 of the friction clutch 40, and a vehicle acceleration in the front to back direction by various sensors. Furthermore, the first clutch rotation speed Ncl1 has the same value as the engine rotation speed Ne. For this reason, the first clutch rotation speed sensor 69 may be substituted by the crank angle sensor 65. Further, the second clutch rotation speed Ncl2 has the same value as the rotation speed of the carrier C1. For this reason, the second clutch rotation speed sensor 70 may be substituted by a sensor that measures the rotation speed of the carrier C1 on the assumption that the sensor is provided already.

The HVECU 50 calculates a requested drive force, a requested power, and a requested torque for the hybrid vehicle based on the acquired information. The HVECU 50 calculates a requested engine torque, a requested MG1 torque, and a requested MG2 torque based on, for example, the requested vehicle drive force calculated as above. The HVECU 50 transmits the requested engine torque to the engine ECU 51 so that the requested engine torque is output to the engine ENG, and transmits the requested MG1 torque and the requested MG2 torque to the MGECU 52 so that the requested MG1 torque and the requested MG2 torque are output to the first rotary machine MG1 and the second rotary machine MG2.

Further, the HVECU 50 controls the friction clutch 40 based on the travel mode or the like to be described later. At that time, when the friction clutch 40 is, for example, a hydraulic driven clutch, a hydraulic pressure instruction value for the friction clutch 40 is output to a hydraulic pressure adjustment device (not illustrated). The hydraulic pressure adjustment device is a device that outputs a hydraulic pressure in response to the instruction value, and controls the gap between the first engagement component 41 and the second engagement component 42, that is, the release state or the engagement state of the friction clutch 40. The friction clutch 40 starts to become the half engagement state in accordance with the rising (the little rising) of the hydraulic pressure to be supplied.

Here, in the hybrid system 100, an electric vehicle (EV) travel mode and a hybrid vehicle (HV) travel mode are set, and hence the hybrid vehicle may travel in either of the travel modes.

The EV travel mode indicates a travel mode in which only the power of the second rotary machine MG2 is transmitted to the drive wheel W. The HV travel mode indicates a travel mode in which the vehicle travels while only the power of the engine ENG is transmitted to the drive wheel W and the vehicle travels while the power of the second rotary machine MG2 is also transmitted to the drive wheel W in addition to the power of the engine ENG. In the hybrid system 100, for example, the EV travel mode is selected in a low load operation state, and the HV travel mode is selected when a high-load operation is requested.

FIG. 3 illustrates the operation engagement table of the hybrid system 100 at every travel mode. In the section of the friction clutch 40 of the operation engagement table, the circle mark indicates the engagement state, and the "-" mark indicates the release state.

[EV Travel Mode]

In the EV travel mode, the vehicle travels while the friction clutch 40 is completely engaged in the normal case, and the vehicle travels while the friction clutch 40 is released when the electric consumption needs to be improved. For example, the EV travel mode in the normal case is selected when there is a concern of overcharging due to the SOC of the secondary battery which becomes larger than a first predetermined value. Further, the EV travel mode in the clutch release state is selected when the SOC of the secondary battery is a first predetermined value or less and the secondary battery may be charged or when the SOC of the secondary battery is a second predetermined value or less (<the first predetermined value) and the secondary battery needs to be charged.

In the EV travel mode, when there is no need to charge the secondary battery based on the SOC, the HVECU 50 causes the engine ENG to be rotated and causes the friction clutch 40 to completely engage using the clutch ECU 53 for the electric consumption of the engine brake. In this case, the HVECU 50 generates a vehicle drive force in the hybrid vehicle in the forward travel direction by outputting the positive MG2 torque Tmg2 in response to the loss amount caused by the engine brake and the requested vehicle drive force as the normal rotation in the second rotary machine MG2 using the MGECU 52. In the configuration of this example, the first rotary machine MG1 is stopped at that time (Nmg1=0 and Tmg1=0). The normal rotation of the second rotary machine MG2 indicates the rotation direction of the MG2 rotation shaft 13 or the ring gear R2 when the vehicle travels forward.

Meanwhile, when the secondary battery may be charged or needs to be charged based on the SOC, the HVECU 50 releases the friction clutch 40 by a release control since the electric consumption caused by the engine brake is not essentially needed. In this case, the HVECU 50 generates a vehicle drive force in the hybrid vehicle in the forward travel direction by outputting the positive MG2 torque Tmg2 in response to the requested vehicle drive force as the normal rotation in the second rotary machine MG2 using the MGECU 52. At that time, the HVECU 50 stops the engine ENG by a stop control (Ne=0 and Te=0). Further, in the configuration of this example, the first rotary machine MG1 is stopped at that time (Nmg1=0 and Tmg1=0).

[HV Travel Mode]

In the HV travel mode, the vehicle travels by transmitting only the engine torque Te or the engine torque Te and the MG2 torque Tmg2 to the gear 31. In this case, the HVECU 50 calculates the engine torque Te and the positive MG2 torque Tmg2 in response to the requested vehicle drive force and transmits the output instruction to the ENGECU 51 and the MGECU 52 so that a vehicle drive force is generated in the hybrid vehicle in the forward travel direction. At that time, when the secondary battery may be charged or needs to be charged based on the SOC, the HVECU 50 may generate power in the first rotary machine MG1 by outputting, for example, the negative MG1 torque Tmg1 to the first rotary machine MG1 in the normal rotation state.

Incidentally, when the EV travel mode in the clutch release state is switched to the HV travel mode, the HVECU 50 controls the friction clutch 40 in the engagement state, and increases the engine rotation speed Ne of the stopped engine ENG by the rotation torque (that is, the rotation torque of the gear 31 or the ring gear R1) of the drive wheel W so as to perform the push-start of the engine ENG. For example, when it is determined that the EV travel mode in the clutch release state needs to be switched to the HV travel mode (that is, the push-start of the engine ENG is needed) in accordance with an increase in the requested vehicle drive force or an increase in the vehicle speed, the HVECU 50 sets, for example, an engine start-up flag so as to transmit an engagement instruction for the friction clutch 40 to the clutch ECU 53 and to transmit a start-up instruction for the engine ENG to the engine ECU 51. At that time, the HVECU 50 transmits a control instruction for the first rotary machine MG1 for controlling the clutch differential rotation speed ΔNcl of the friction clutch 40 and a control instruction for the second rotary machine MG2 for compensating the loss amount (that is, the drive force decrease amount in the output shaft of the power transmission device 1 or the drive wheel W) caused by the rotation of the engine ENG to the MGECU 52. The clutch differential rotation speed ΔNcl indicates a difference in rotation speed between the first engagement component 41 and the second engagement component 42 of the friction clutch 40. Here, the clutch differential rotation speed ΔNcl in the case of "Ncl2>Ncl1 (Ne)" is set as a positive value.

Figure 4:
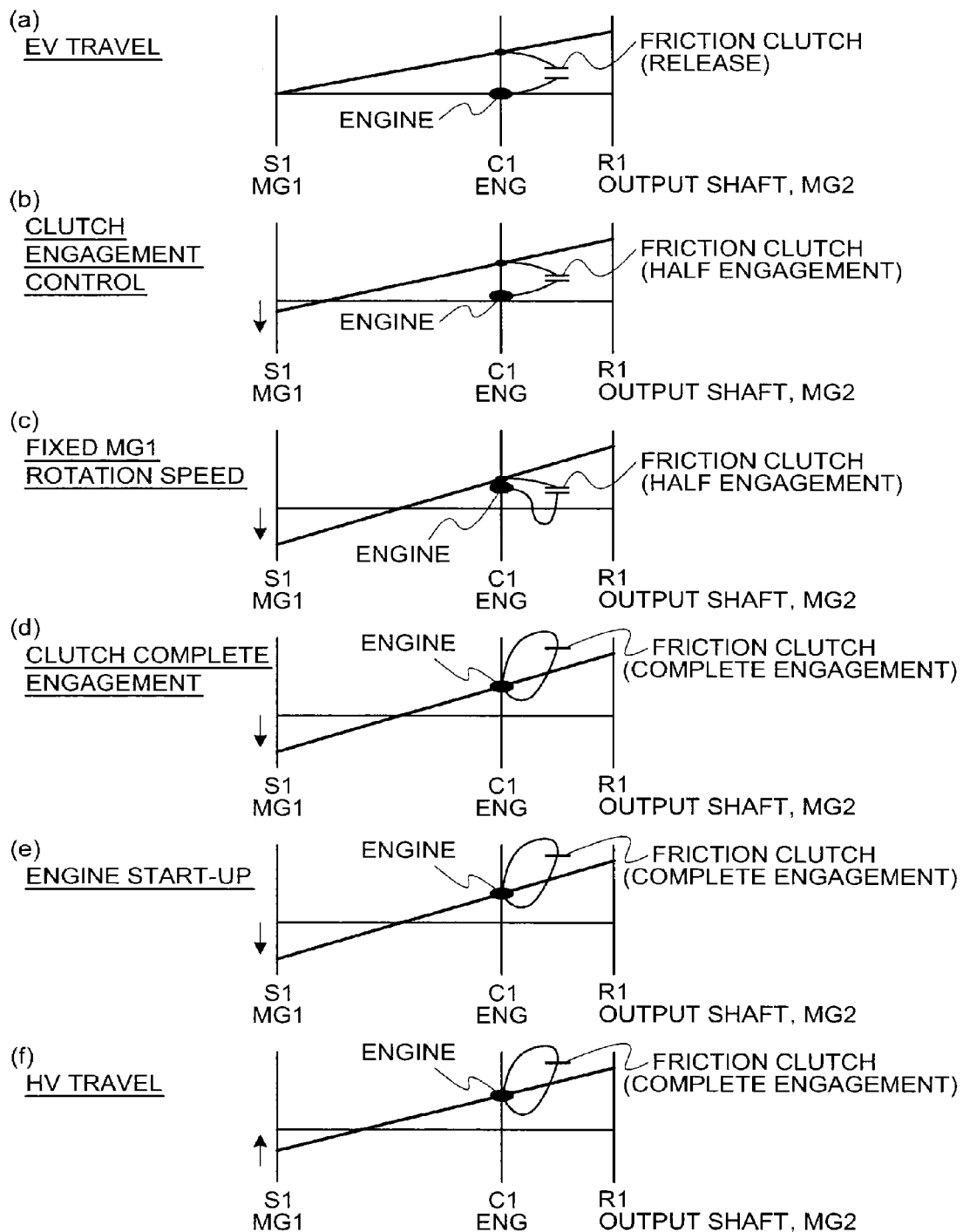
FIGS. 4A, 4B, 4C, 4D, 4E, and 4F are diagrams illustrating an operation of switching an EV travel mode to an HV travel mode at a high vehicle speed of the related art by an alignment chart.
Figure 5:
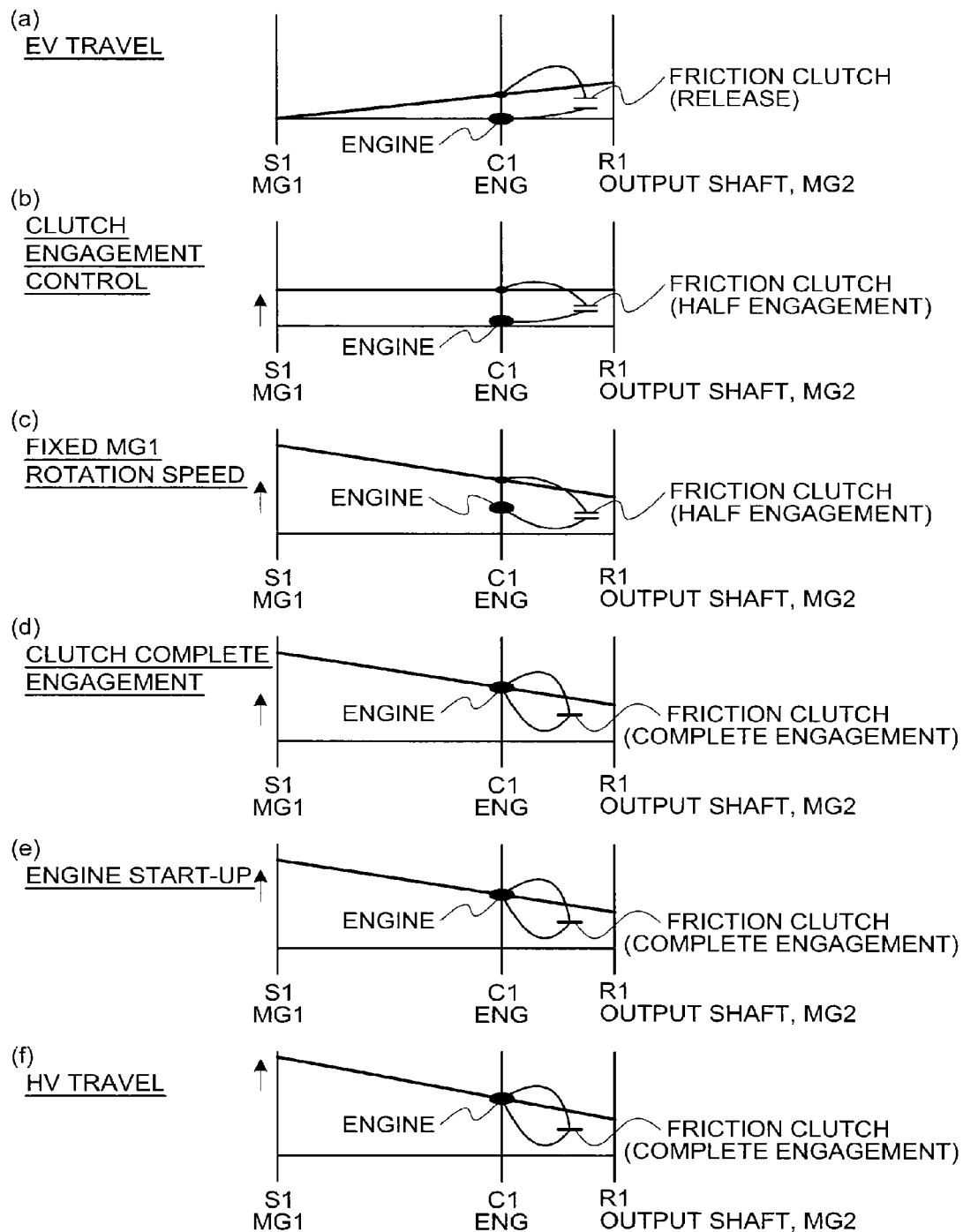
FIGS. 5A, 5B, 5C, 5D, 5E, and 5F are diagrams illustrating an operation of switching the EV travel mode to the HV travel mode at a low vehicle speed of the related art by an alignment chart.

For example, FIG. 4 illustrates an operation of switching the EV travel mode in the clutch release state to the HV travel mode of the related art in the high vehicle speed travel state (vehicle speed V≥predetermined vehicle speed Vt) as an alignment chart. Further, FIG. 5 illustrates an operation of switching the EV travel mode in the clutch release state to the HV travel mode of the related art in the low vehicle speed travel state (V<Vt) as an alignment chart. Furthermore, FIGS. 4(a) and 4(b) and FIGS. 5(a) and 5(b) are the same as the switching operations of the embodiment to be described below. The state of the EV travel mode in the clutch release state indicates a state until the engine start-up flag is set in the time chart for the switching operation illustrated in FIG. 6 or 7. In the EV travel mode of each of the drawings, the engine ENG and the first rotary machine MG1 are stopped (Ne=0, Te=0, Nmg1=0, and Tmg1=0), and the friction clutch 40 is released (FIGS. 4(a) and 5(a)). In the friction clutch 40 of the release state, the requested clutch torque (that is, the clutch torque capacity) becomes zero, and the clutch differential rotation speed ΔNcl becomes higher than zero. The predetermined vehicle speed Vt is set as the vehicle speed V, for example, when the second clutch rotation speed Ncl2 becomes the same rotation speed as the ignition permission rotation speed Ne1 of the engine ENG. The ignition permission rotation speed Ne1 indicates the engine rotation speed Ne at which the ignition is allowed when the engine ENG is started up.

[Travel Mode Selection in High Vehicle Speed Travel State]

Figure 6:
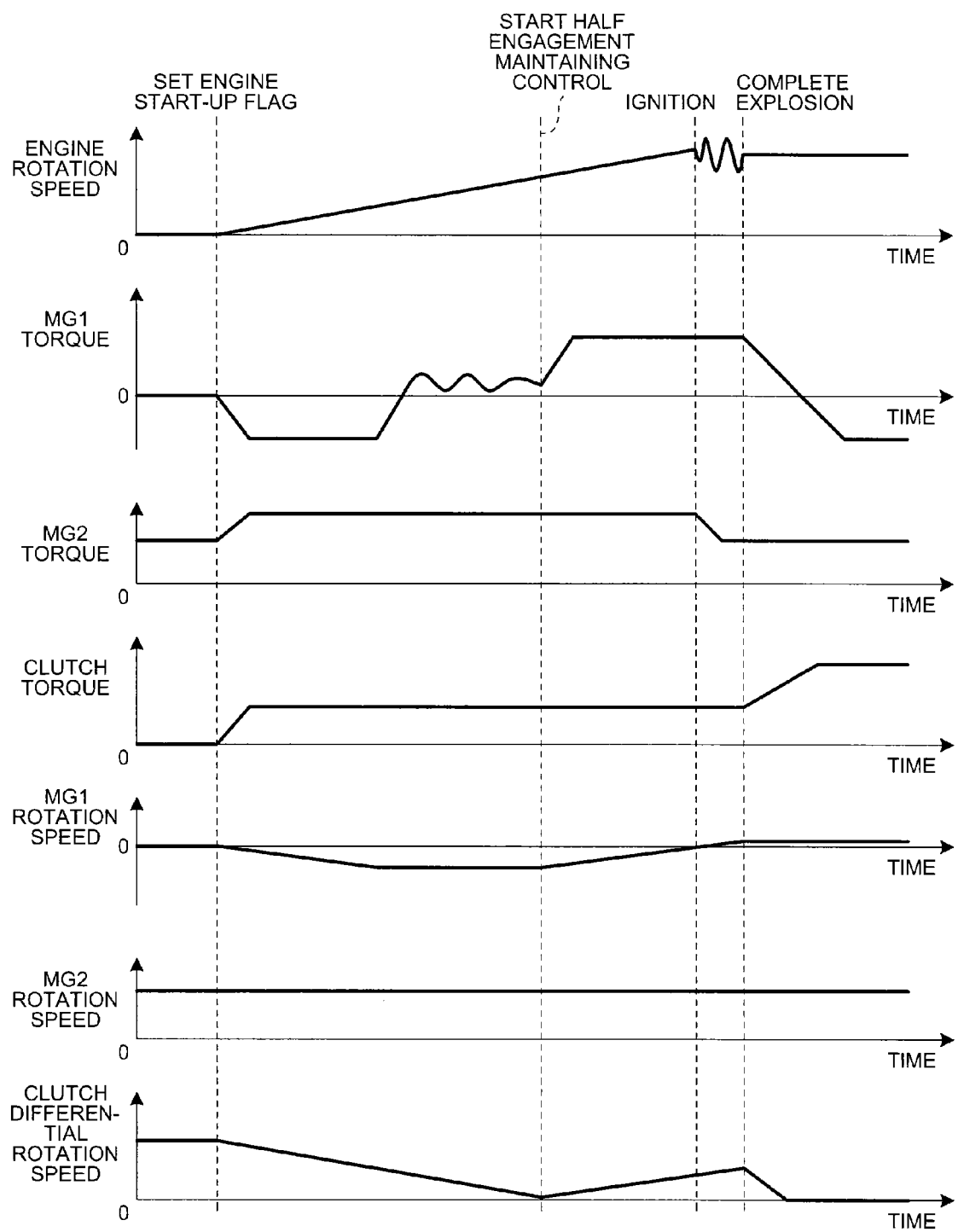
FIG. 6 is a time chart illustrating an operation of switching the EV travel mode to the HV travel mode at a high vehicle speed of the embodiment.

When it is determined that the push-start of the engine ENG is needed, the HVECU 50 half engages the friction clutch 40 while controlling the first rotary machine MG1 in the reverse rotation direction immediately after the engine start-up flag is set as illustrated in FIGS. 4(b) and 6. The control to the reverse rotation direction indicates a control in which the MG1 rotation speed Nmg1 becomes a reverse rotation state when the MG1 rotation speed Nmg1 is in a normal rotation state or is zero and the MG1 rotation speed Nmg1 in a reverse rotation state is increased when the MG1 rotation speed Nmg1 is in a reverse rotation state. When the engine start-up control starts, the clutch ECU 53 outputs a hydraulic pressure to be supplied in response to the requested clutch torque in the half engagement state to the hydraulic pressure adjustment device. The clutch torque of the friction clutch 40 gradually increases in response to an increase in the hydraulic pressure to be supplied. At that time, the negative MG1 torque Tmg1 is output by a reverse rotation in the first rotary machine MG1. The MG1 torque Tmg1 is output in accordance with a change in the clutch torque of the friction clutch 40. At that time, the rotation torque (the rotation torque of the gear 31 or the ring gear R1) of the drive wheel W is used to increase the engine rotation speed Ne in accordance with the rising (an increase in the clutch torque) of the hydraulic pressure to be supplied. Thus, the HVECU 50 increases the positive MG2 torque so as to compensate the rotation torque decrease amount.

As illustrated in FIG. 6, the HVECU 50 switches the negative MG1 torque Tmg1 to the positive MG1 torque Tmg1 and decreases the clutch differential rotation speed ΔNcl while increasing or decreasing the positive MG1 torque Tmg1, so that the engine rotation speed Ne is continuously increased.

Here, in the hybrid system of the related art, when the second clutch rotation speed Ncl2 decreases to a predetermined rotation speed Ncl2a or less, the MG1 rotation speed Nmg1 is fixed while the friction clutch 40 is maintained in the half engagement state as illustrated in FIG. 4(c). The predetermined rotation speed Ncl2a indicates, for example, a rotation speed equal to or higher than the ignition permission rotation speed Ne1 of the engine ENG. Further, the MG1 rotation speed Nmg1 indicates, for example, a rotation speed when the second clutch rotation speed Ncl2 is the predetermined rotation speed Ncl2a. Then, in the hybrid system, the friction clutch 40 is completely engaged so that the engine rotation speed Ne is increased to at least the ignition permission rotation speed Ne1 (FIG. 4(d)). The hybrid system ignites the engine ENG (FIG. 4(e)), and selects the HV travel mode (FIG. 4(f)).

[Travel Mode Selection in Low Vehicle Speed Travel State]

Figure 7:
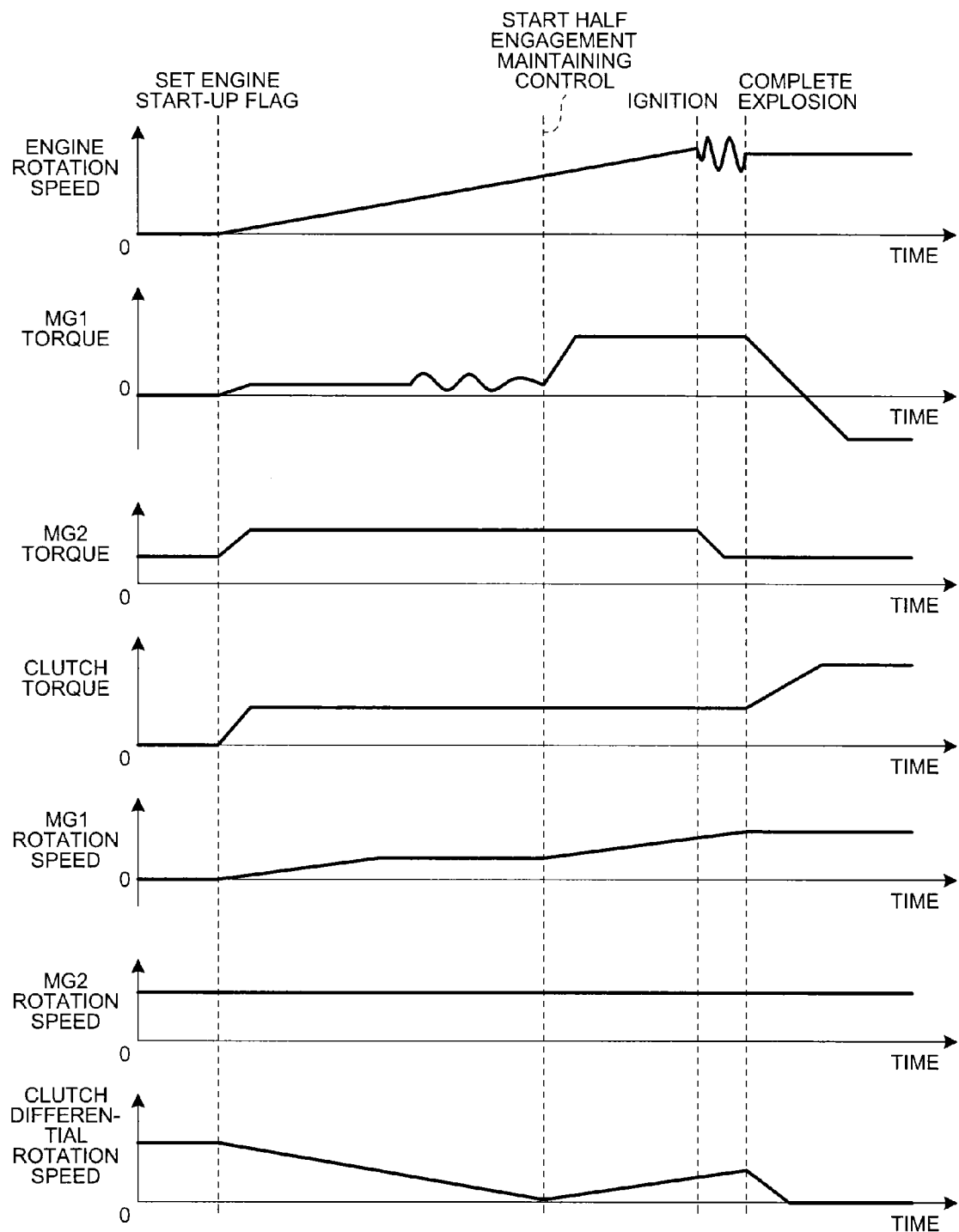
FIG. 7 is a time chart illustrating an operation of switching the EV travel mode to the HV travel mode at a low vehicle speed of the embodiment.

When it is determined that the push-start of the engine ENG is needed, the HVECU 50 half engages the friction clutch 40 by the hydraulic pressure to be supplied in response to the requested clutch torque in the half engagement state while controlling the first rotary machine MG1 in the positive rotation direction immediately after the engine start-up flag is set as illustrated in FIGS. 5(b) and 7. The control to the positive rotation direction indicates a control in which the MG1 rotation speed Nmg1 becomes a normal rotation state when the MG1 rotation speed Nmg1 is in a reverse rotation state or is zero and the MG1 rotation speed Nmg1 in a normal rotation state is increased when the MG1 rotation speed Nmg1 is in a normal rotation state. Since the clutch torque of the friction clutch 40 gradually increases in accordance with an increase in the hydraulic pressure to be supplied, the positive MG1 torque Tmg1 is output by a normal rotation in accordance with a change in the clutch torque in the first rotary machine MG1. Further, when the engine start-up control starts, the HVECU 50 increases the positive MG2 torque so as to compensate the decrease amount of the rotation torque (the rotation torque of the gear 31 or the ring gear R1) of the drive wheel W.

As illustrated in FIG. 7, the HVECU 50 decreases the clutch differential rotation speed ΔNcl while increasing or decreasing the positive MG1 torque Tmg1, so that the engine rotation speed Ne is continuously increased.

Here, in the hybrid system of the related art, when the second clutch rotation speed Ncl2 increases to a predetermined rotation speed Ncl2b or more as illustrated in FIG. 5(c), the MG1 rotation speed Nmg1 is fixed while the friction clutch 40 is maintained in the half engagement state.

The predetermined rotation speed Ncl2b indicates, for example, a rotation speed equal to or higher than the ignition permission rotation speed Ne1 of the engine ENG as in the high vehicle speed travel state. Further, the MG1 rotation speed Nmg1 indicates, for example, a rotation speed when the second clutch rotation speed Ncl2 is the predetermined rotation speed Ncl2b. Then, in the hybrid system, the friction clutch 40 is completely engaged so that the engine rotation speed Ne is increased to at least the ignition permission rotation speed Ne1 (see FIG. 5(d)). The hybrid system ignites the engine ENG (FIG. 5(e)), and selects the HV travel mode (FIG. 5(f)).

In this way, in the hybrid system of the related art, the engine ENG is ignited after the friction clutch 40 is completely engaged regardless of the vehicle speed V. For this reason, in the hybrid system, the ripple torque of the engine ENG which is generated with the ignition is transmitted to the first differential device 21, and is transmitted to the output shaft of the power transmission device 1 through the first differential device 21. Further, in the hybrid system of the related art, when the clutch differential rotation speed ΔNcl of the friction clutch 40 decreases to, for example, a value close to 0 even when the engine ENG is ignited in the half engagement state of the friction clutch 40, there is a possibility that the friction clutch 40 may be completely engaged. Accordingly, the ripple torque may be transmitted to the first differential device 21 or the like.

Therefore, the hybrid system 100 of the embodiment is configured so that the transmission of the ripple torque of the engine ENG to the power transmission device 1 is suppressed during the push-start of the engine.

Here, the time for the push-start of the engine is set as a period until a complete explosion of the engine ENG after the HVECU 50 starts the start-up control for the engine ENG (for example, after the engine start-up flag is set). The complete explosion of the engine ENG is a state where the combustion state of the engine ENG becomes stable without fire extinguishment after the ignition. For example, the HVECU 50 detects the complete explosion of the engine ENG at a timing when a predetermined time (several milliseconds) elapses from the initial ignition of the engine ENG. For example, when the HVECU 50 may receive a signal of a determination result of the complete explosion of the engine ENG from the ENGECU 51, the complete explosion of the engine ENG may be determined by using this signal.

Specifically, in the hybrid system 100, the transmission of the ripple torque of the engine ENG to the power transmission device 1 is suppressed in a manner such that the friction clutch 40 is maintained in the half engagement state at least until the engine rotation speed Ne increases to the ignition permission rotation speed Ne1 (Ne≥Ne1) or at least until the complete explosion of the engine ENG.

Here, the half engagement control for the friction clutch 40 starts with the start of the engine start-up control. Further, the half engagement control is performed while the first rotary machine MG1 is controlled in the reverse rotation direction in the high vehicle speed travel state, and the half engagement control is performed while the first rotary machine MG1 is controlled in the normal rotation direction in the low vehicle speed travel state. The half engagement maintaining control for the friction clutch 40 is a control in which the half engagement state of the friction clutch 40 started with the start of the engine start-up control is maintained.

The case where the friction clutch 40 is switched from the half engagement state to the complete engagement state indicates a case where the clutch differential rotation speed ΔNcl decreases to a value close to zero or zero or the clutch torque smaller than the ripple torque increases to the ripple torque or a value close thereto. For this reason, the time of starting the half engagement maintaining control for the friction clutch 40 is determined based on the clutch torque or the clutch differential rotation speed ΔNcl of the friction clutch 40. In this example, the clutch differential rotation speed ΔNcl is used.

The half engagement maintaining control for the friction clutch 40 is performed when the clutch differential rotation speed ΔNcl decreases to a predetermined rotation speed Ncl0. When the friction clutch 40 is not controlled in the complete engagement state, the predetermined rotation speed Ncl0 is set to a value larger than zero. For example, if the half engagement maintaining control is performed when the friction clutch 40 is switched from the half engagement state to the complete engagement state, the predetermined rotation speed Ncl0 is set to a value substantially close to zero. Meanwhile, the predetermined rotation speed Ncl0 (>0) may be set to a larger value, and may be set to a value obtained in consideration of the detection error of the clutch differential rotation speed ΔNcl, a change in the rotation torque (the rotation torque of the gear 31 or the ring gear R1) of the drive wheel W, and a deviation or a change in the hydraulic pressure to be supplied of the friction clutch 40. On the contrary, when the friction clutch 40 is returned to the half engagement state immediately after the complete engagement state thereof, the predetermined rotation speed Ncl0 is set to zero.

The half engagement maintaining control for the friction clutch 40 is performed by the control for the first rotary machine MG1. The control for the first rotary machine MG1 is performed by the control for the MG1 rotation speed Nmg1 in the normal rotation direction in order to increase the decreased clutch differential rotation speed ΔNcl again.

Figure 8:
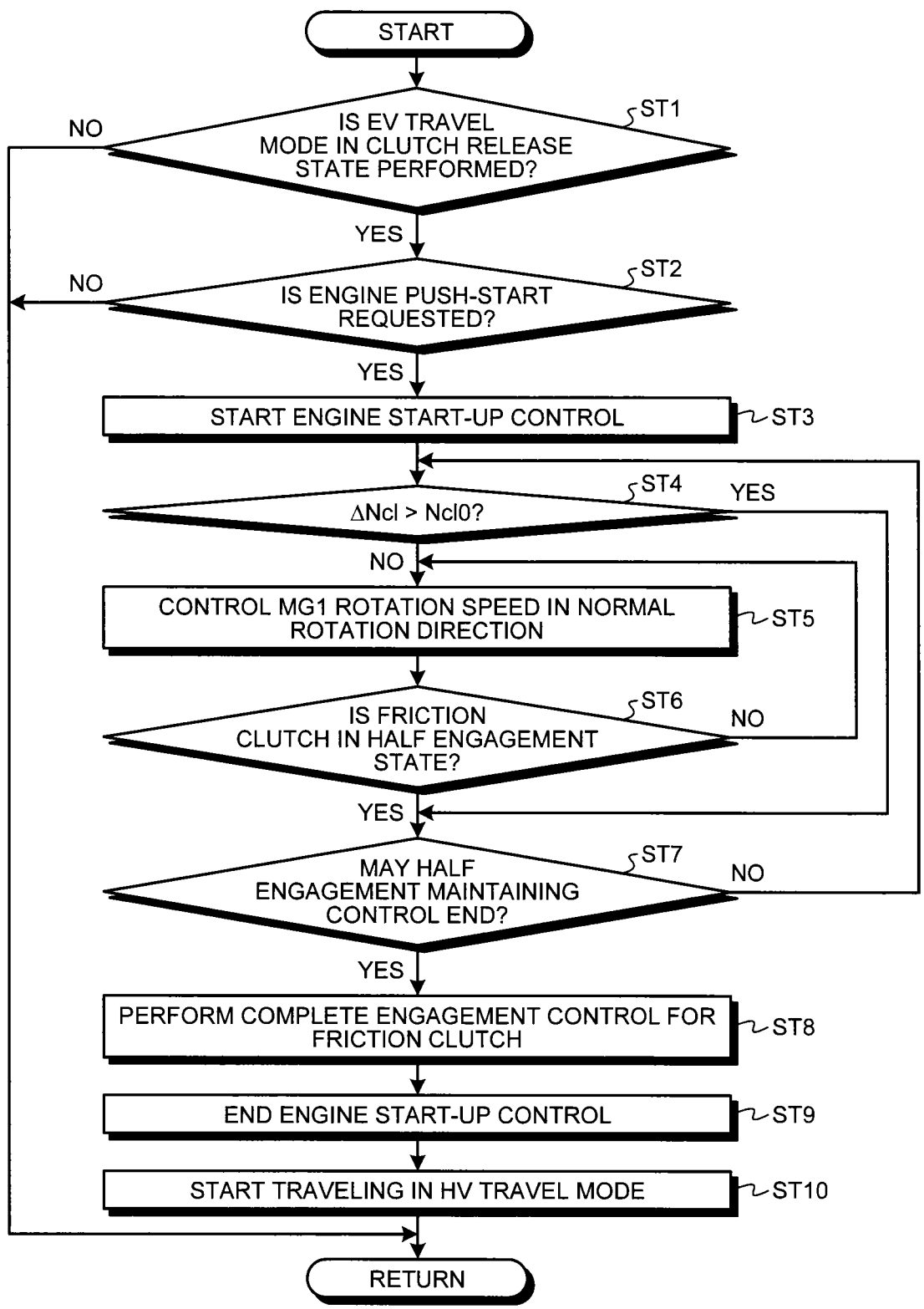
FIG. 8 is a flowchart illustrating an operation of switching the EV travel mode to the HV travel mode of the embodiment.

Hereinafter, an operation of switching the EV travel mode in the clutch release state to the HV travel mode will be described with reference to the flowchart of FIG. 8.

The HVECU 50 determines whether or not the vehicle travels in the EV travel mode in the clutch release state (step ST1). The HVECU 50 first ends the calculation process when the vehicle does not travel in this travel mode.

When the vehicle travels in the travel mode, the HVECU 50 determines whether or not the push-start of the engine ENG is requested (step ST2). The request of the start-up is determined by, for example, an accelerator opening degree, a throttle opening degree, a SOC, and a front-to-back acceleration. For example, a driver tries to increase the requested vehicle drive force by the operation of the accelerator when the accelerator opening degree becomes larger than a predetermined value, and hence it is determined that the start-up is requested. Further, the vehicle which travels in an automatic travel mode tries to increase the requested vehicle drive force, for example, when the throttle opening degree becomes larger than a predetermined value, and hence it is determined that the start-up is requested. When the SOC of the secondary battery is equal to or smaller than a second predetermined value (<first predetermined value), the charging of the secondary battery is needed, and hence it is determined that the start-up is requested. When a hill climbing state is detected by the front-to-back acceleration, the requested vehicle drive force increases in accordance with the gradient thereof, and hence it is determined that the start-up is requested.

The HVECU 50 first ends the calculation process when there is not a request for the push-start of the engine ENG.

Meanwhile, the HVECU 50 starts the start-up control for the engine ENG when there is a request for the push-start of the engine ENG (step ST3). As described above, the start-up control is performed by controlling the friction clutch 40, the first rotary machine MG1, and the second rotary machine MG2 in response to whether or not the vehicle speed V is equal to or higher than the predetermined vehicle speed Vt.

The HVECU 50 that starts the start-up control for the engine ENG determines whether or not the clutch differential rotation speed $\Delta Ncl$ becomes higher than the predetermined rotation speed $Ncl0$ ($>0$) (step ST4).

When the clutch differential rotation speed $\Delta Ncl$ is higher than the predetermined rotation speed $Ncl0$, the friction clutch 40 is in the half engagement state, and hence the routine proceeds to step ST7. Meanwhile, when the clutch differential rotation speed $\Delta Ncl$ is equal to or lower than the predetermined rotation speed $Ncl0$, there is a possibility that the friction clutch 40 may be completely engaged. Accordingly, the HVECU 50 controls the MG1 rotation speed $Nmg1$ in the normal rotation direction so as to increase the clutch differential rotation speed $\Delta Ncl$ (step ST5). At that time, the MG1 rotation speed $Nmg1$ is controlled so that the clutch differential rotation speed $\Delta Ncl$ is higher than the predetermined rotation speed $Ncl0$. Accordingly, in the hybrid system 100, the half engagement maintaining control for the friction clutch 40 starts.

Furthermore, when the predetermined rotation speed $Ncl0$ is set to zero, it is determined whether or not the clutch differential rotation speed $\Delta Ncl$ decreases to the predetermined rotation speed $Ncl0$ ($=0$) in step ST4. Then, when the clutch differential rotation speed $\Delta Ncl$ does not decrease to the predetermined rotation speed $Ncl0$, the friction clutch 40 is in the half engagement state, and hence the routine proceeds to step ST7. Meanwhile, when the clutch differential rotation speed $\Delta Ncl$ decreases to the predetermined rotation speed $Ncl0$ ($=0$), the friction clutch 40 is in the complete engagement state, and hence the routine proceeds to step ST5 to perform the half engagement maintaining control for the friction clutch 40 so that the clutch differential rotation speed $\Delta Ncl$ is increased.

After the half engagement maintaining control is performed, the HVECU 50 determines whether or not the friction clutch 40 is in the half engagement state (step ST6). The determination in step ST6 is performed by, for example, the determination on whether or not the clutch differential rotation speed $\Delta Ncl$ decreases to zero. In this case, when the clutch differential rotation speed $\Delta Ncl$ is larger than zero, it is determined that the friction clutch 40 is in the half engagement state.

When it is determined that the friction clutch 40 is not in the half engagement state, the HVECU 50 returns the routine to step ST5 so that the half engagement maintaining control is continued.

When it is determined that the friction clutch 40 becomes the half engagement state in step ST4 or ST6, the HVECU 50 determines whether or not the half engagement maintaining control may be ended (step ST7). In step ST7, it is determined whether or not the half engagement maintaining control may be ended. Thus, in step ST7, it is determined whether or not the engine rotation speed Ne increases to the ignition permission rotation speed Ne1 or more. Further, in step ST7, it may be determined whether or not the engine ENG reaches the complete explosion instead of the determination based on the ignition permission rotation speed Ne1.

When the engine rotation speed Ne is lower than the ignition permission rotation speed Ne1 (or the engine ENG does not reach the complete explosion), the HVECU 50 determines that the half engagement maintaining control may not end, and returns the routine to step ST4.

Meanwhile, when the engine rotation speed Ne is equal to or higher than the ignition permission rotation speed Ne1 (or the engine ENG reaches the complete explosion), the HVECU 50 completely engages the friction clutch 40 (step ST8), and ends the start-up control for the engine ENG (step ST9). Then, the HVECU 50 starts travelling in the HV travel mode (step ST10).

[Travel Mode Selection in High Vehicle Speed Travel State]

Here, the selection of the travel mode in the high vehicle speed travel state will be described based on the time chart of FIG. 6.

When the clutch torque of the friction clutch 40 increases to the requested clutch torque in the half engagement state after the start-up control for the engine ENG starts, the HVECU 50 maintains the hydraulic pressure to be supplied and hence maintains the clutch torque at a constant value. The HVECU 50 maintains the negative MG1 torque $Tmg1$ and the positive MG2 torque $Tmg2$ at the value at that time. Subsequently, the HVECU 50 increases or decreases the MG1 torque $Tmg1$ switched from a negative value to a positive value while maintaining the MG1 rotation speed $Nmg1$ in the reverse rotation direction at a constant value, and hence continuously increases the engine rotation speed Ne while decreasing the clutch differential rotation speed $\Delta Ncl$.

In the example of FIG. 6, when the engine rotation speed Ne is lower than the ignition permission rotation speed Ne1 (or before the engine ENG reaches the complete explosion), the clutch differential rotation speed $\Delta Ncl$ decreases to the predetermined rotation speed $Ncl0$ ($>0$), and hence the friction clutch 40 may be switched to the complete engagement state. For this reason, the HVECU 50 controls the MG1 rotation speed $Nmg1$ in the normal rotation direction. Here, the MG1 rotation speed $Nmg1$ in the normal rotation direction is increased. At that time, the HVECU 50 increases the positive MG1 torque $Tmg1$ to the target value, and maintains the MG1 torque at the target value. Further, at that time, the HVECU 50 does not change the clutch torque (that is, the hydraulic pressure to be supplied) of the friction clutch 40.

For example, when the clutch differential rotation speed $\Delta Ncl$ is higher than the predetermined rotation speed $Ncl0$, the MG1 rotation speed $Nmg1$ is maintained at the increased rotation speed. Then, when the clutch differential rotation speed $\Delta Ncl$ decreases to the predetermined rotation speed $Ncl0$ again, the MG1 rotation speed is further increased. In the half engagement maintaining control for the friction clutch 40, the MG1 rotation speed $Nmg1$ is repeatedly increased and maintained until the engine rotation speed Ne becomes equal to or higher than the ignition permission rotation speed Ne1 (or until the engine ENG reaches the complete explosion). The MG1 rotation speed $Nmg1$ of the example illustrated in FIG. 6 gradually increases along with the clutch differential rotation speed $\Delta Ncl$ until the engine rotation speed Ne becomes the ignition permission rotation speed Ne1 or more (or until the engine ENG reaches the complete explosion). Accordingly, the friction clutch 40 is maintained in the half engagement state while the engine rotation speed Ne is continuously increased. Furthermore, in the half engagement maintaining control, the target value of the MG1 rotation speed $Nmg1$ obtained when the engine rotation speed Ne reaches the ignition permission rotation speed Ne1 (or when the engine ENG reaches the complete explosion) may be calculated, and may be gradually increased to the target value as illustrated in FIG. 6.

When the engine rotation speed Ne increases to the ignition permission rotation speed Ne1, the HVECU 50 ignites the engine ENG. At that time, since the engine torque Te is transmitted to the power transmission device 1 through the friction clutch 40 in the half engagement state by the ignition of the engine ENG, the HVECU 50 decreases the increase amount of the MG2 torque Tmg2 which is increased with the start of the engine start-up control in the second rotary machine MG2. Here, the friction clutch 40 is maintained in the half engagement state until the engine ENG reaches the complete explosion.

The HVECU 50 fully engages the friction clutch 40 after the complete explosion of the engine ENG. At that time, the HVECU 50 maintains the MG1 rotation speed Nmg1 at the rotation speed in the complete explosion state and switches the MG1 torque Tmg1 from a positive value to a negative value after the complete explosion of the engine ENG.

[Travel Mode Selection in Low Vehicle Speed Travel State]

Next, the selection of the travel mode in the low vehicle speed travel state will be described based on the time chart of FIG. 7.

After the start-up control for the engine ENG starts, the HVECU 50 maintains the increased clutch torque of the friction clutch 40 at a constant value similarly to the high vehicle speed travel state. The HVECU 50 maintains the positive MG1 torque Tmg1 and the MG2 torque Tmg2 at the value increased to the requested clutch torque. Subsequently, the HVECU 50 increases or decreases the positive MG1 torque Tmg1 while maintaining the MG1 rotation speed Nmg1 in the normal rotation direction at a constant value, and continuously increases the engine rotation speed Ne while decreasing the clutch differential rotation speed $\Delta Ncl$.

Even in the example of FIG. 7, when the engine rotation speed Ne is lower than the ignition permission rotation speed Ne1 (or before the engine ENG reaches the complete explosion), the clutch differential rotation speed $\Delta Ncl$ decreases to the predetermined rotation speed Ncl0 (>0), and hence the friction clutch 40 may be switched to the complete engagement state. For this reason, the HVECU 50 controls the MG1 rotation speed Nmg1 in the normal rotation direction. Here, the MG1 rotation speed Nmg1 in the normal rotation direction is further increased. At that time, the HVECU 50 increases the positive MG1 torque Tmg1 to the target value, and maintains the MG1 torque at the target value. The control for the MG1 rotation speed Nmg1 (i.e., the half engagement maintaining control for the friction clutch 40) is performed similarly to the high vehicle speed travel state. Thus, at that time, the HVECU 50 does not change the clutch torque (i.e., the hydraulic pressure to be supplied) of the friction clutch 40.

When the engine rotation speed Ne increases to the ignition permission rotation speed Ne1, the HVECU 50 ignites the engine ENG similarly to the high vehicle speed travel state, and then fully engages the friction clutch 40 after the complete explosion of the engine ENG.

In this way, in the embodiment, the clutch differential rotation speed $\Delta Ncl$ of the friction clutch 40 is increased by the control for the MG1 rotation speed Nmg1 in the normal rotation direction at least until the engine rotation speed Ne increases to the ignition permission rotation speed Ne1 (Ne≥Ne1) or at least until the complete explosion of the engine ENG. For this reason, in the power transmission device 1 and the hybrid system 100, it is possible to suppress the half engagement state of the friction clutch 40 from being switched to the complete engagement state due to a change in torque therebetween.

Thus, the power transmission device 1 and the hybrid system 100 may suppress the ripple torque generated in the engine ENG from being transmitted to the power transmission device 1 through the friction clutch 40 during the push-start of the engine. Thus, the power transmission device 1 and the hybrid system 100 may suppress noise or vibration during the push-start of the engine.

Further, when noise or vibration caused by the ripple torque occurs in the power transmission device 1 and the hybrid system 100, there is a need to perform the vibration damping control using the MG1 torque Tmg1 or the MG2 torque Tmg2 of the first rotary machine MG1 or the second rotary machine MG2, for example, in the method of the related art. However, the vibration damping control uses the power of the secondary battery in order to output the MG1 torque Tmg1 for the vibration damping control. However, in the embodiment, such a vibration damping control is not needed, and hence electric consumption or fuel consumption may be improved. Moreover, in the embodiment, since there is no need to output the MG1 torque Tmg1 for the vibration damping control, it is possible to suppress a decrease in the MG2 torque Tmg2 which may be used in the travel state, and hence to widen the EV travel application range. Further, in the embodiment, since noise or vibration is suppressed already and the MG1 torque Tmg1 for the vibration damping control may be suppressed as small as possible even when such a vibration damping control is performed, electric consumption or fuel consumption may be improved and the EV travel application range may be widened compared to the related art.

Further, in the power transmission device 1 and the hybrid system 100, there is no need to decrease the clutch torque of the friction clutch 40 (in other words, the engagement pressure of the friction clutch 40) when the half engagement maintaining control for the friction clutch 40 is performed. Even when the clutch torque needs to be decreased, the decrease amount may be suppressed as small as possible in the power transmission device 1 and the hybrid system 100. Thus, the power transmission device 1 and the hybrid system 100 may suppress the extension of the start-up time of the engine ENG or degradation in the start-up responsiveness.

Particularly, since the power transmission device 1 and the hybrid system 100 maintain the friction clutch 40 in the half engagement state until the complete explosion of the engine ENG, such advantages may be effectively obtained.

MODIFIED EXAMPLE

Incidentally, in the above-described embodiment, the half engagement state of the friction clutch 40 is maintained in a manner such that the MG1 rotation speed Nmg1 is controlled in the normal rotation direction when the clutch differential rotation speed $\Delta Ncl$ of the friction clutch 40 decreases to the predetermined rotation speed Ncl0. In the modified example, the half engagement state of the friction clutch 40 during the push-start of the engine is maintained by a method different from the embodiment.

Specifically, the power transmission device 1 and the hybrid system 100 of the modified example change the control pattern for the first rotary machine MG1 during the push-start of the engine in the configuration of the control device of the embodiment. When the push-start of the engine ENG is requested, the HVECU 50 of the modified example controls the clutch differential rotation speed $\Delta Ncl$ of the friction clutch 40 by the first rotary machine MG1 from the start of the start-up control for the engine ENG so that the friction clutch 40 is maintained in the half engagement state at least until the engine rotation speed Ne increases to the ignition permission rotation speed Ne1 (Ne≥Ne1) or at least until the complete explosion of the engine ENG.

Figure 9:
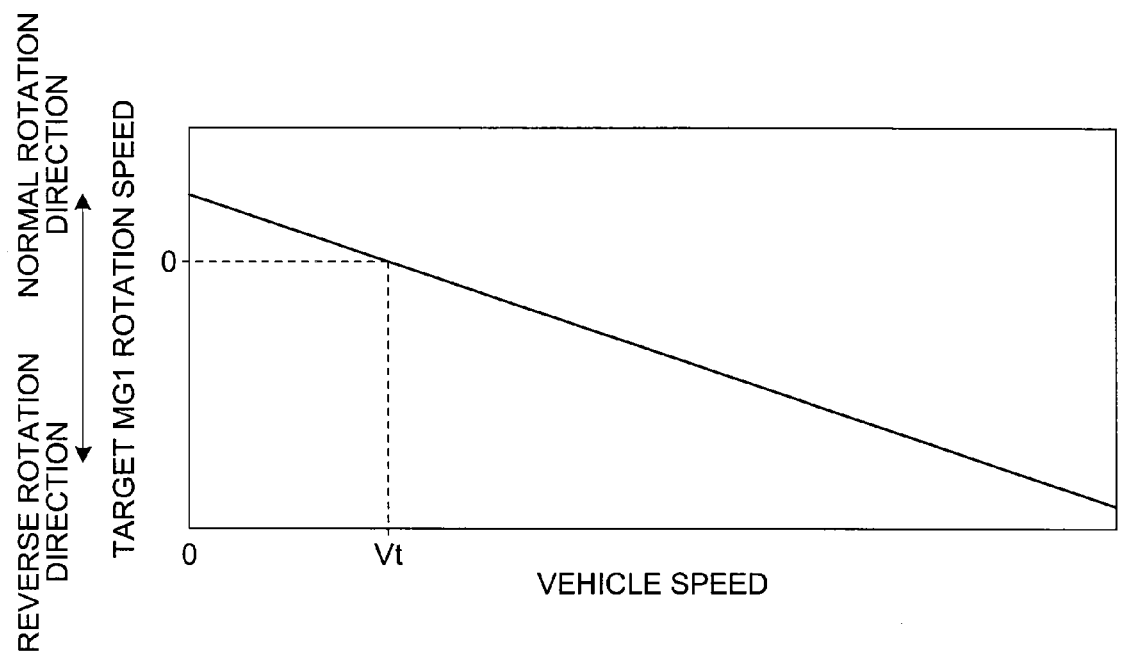
FIG. 9 is a diagram illustrating an example of a target MG1 rotation speed of the modified example.

When the push-start of the engine ENG is requested, the HVECU 50 controls the first rotary machine MG1 so that the clutch differential rotation speed ΔNcl becomes zero or more until the engine rotation speed Ne increases to the ignition permission rotation speed Ne1 from the start of the start-up control for the engine ENG. The HVECU 50 calculates a target value (hereinafter, referred to as the "target MG1 rotation speed") $Nmg1_{tgt}$ of the MG1 rotation speed Nmg1 so that the second clutch rotation speed Ncl2 (that is, the rotation speed of the carrier C1) of the friction clutch 40 becomes equal to or higher than the ignition permission rotation speed Ne1 in the meantime. For example, the target MG1 rotation speed $Nmg1_{tgt}$ is set so that the clutch differential rotation speed ΔNcl gradually decreases from the start of the start-up control for the engine ENG and the clutch differential rotation speed ΔNcl becomes zero or more when the engine rotation speed Ne becomes the ignition permission rotation speed Ne1. Here, since the second clutch rotation speed Ncl2 changes by the influence of the vehicle speed V, the target MG1 rotation speed $Nmg1_{tgt}$ may be changed in response to the vehicle speed V (particularly, a difference in the vehicle speed V). FIG. 9 illustrates an example of the target MG1 rotation speed $Nmg1_{tgt}$ in response to the vehicle speed V. The target MG1 rotation speed $Nmg1_{tgt}$ increases as the vehicle speed V increases in the reverse rotation direction at the high vehicle speed (V≥Vt), and increases as the vehicle speed V decreases in the normal rotation direction at the low vehicle speed (V<Vt).

Further, when the push-start of the engine ENG is requested, the HVECU 50 may calculate the target MG1 rotation speed $Nmg1_{tgt}$ so that the second clutch rotation speed Ncl2 (the rotation speed of the carrier C1) becomes the engine rotation speed (hereinafter, referred to as the "complete explosion rotation speed") Ne2 or more at the complete explosion of the engine until the engine ENG reaches the complete explosion from the start of the start-up control for the engine ENG. For example, the target MG1 rotation speed $Nmg1_{tgt}$ is set so that the clutch differential rotation speed ΔNcl gradually decreases from the start of the start-up control for the engine ENG and the clutch differential rotation speed ΔNcl becomes zero or more when the engine rotation speed Ne becomes the complete explosion rotation speed Ne2. Here, the target MG1 rotation speed $Nmg1_{tgt}$ may be also changed in response to the vehicle speed V (FIG. 9).

Figure 10:
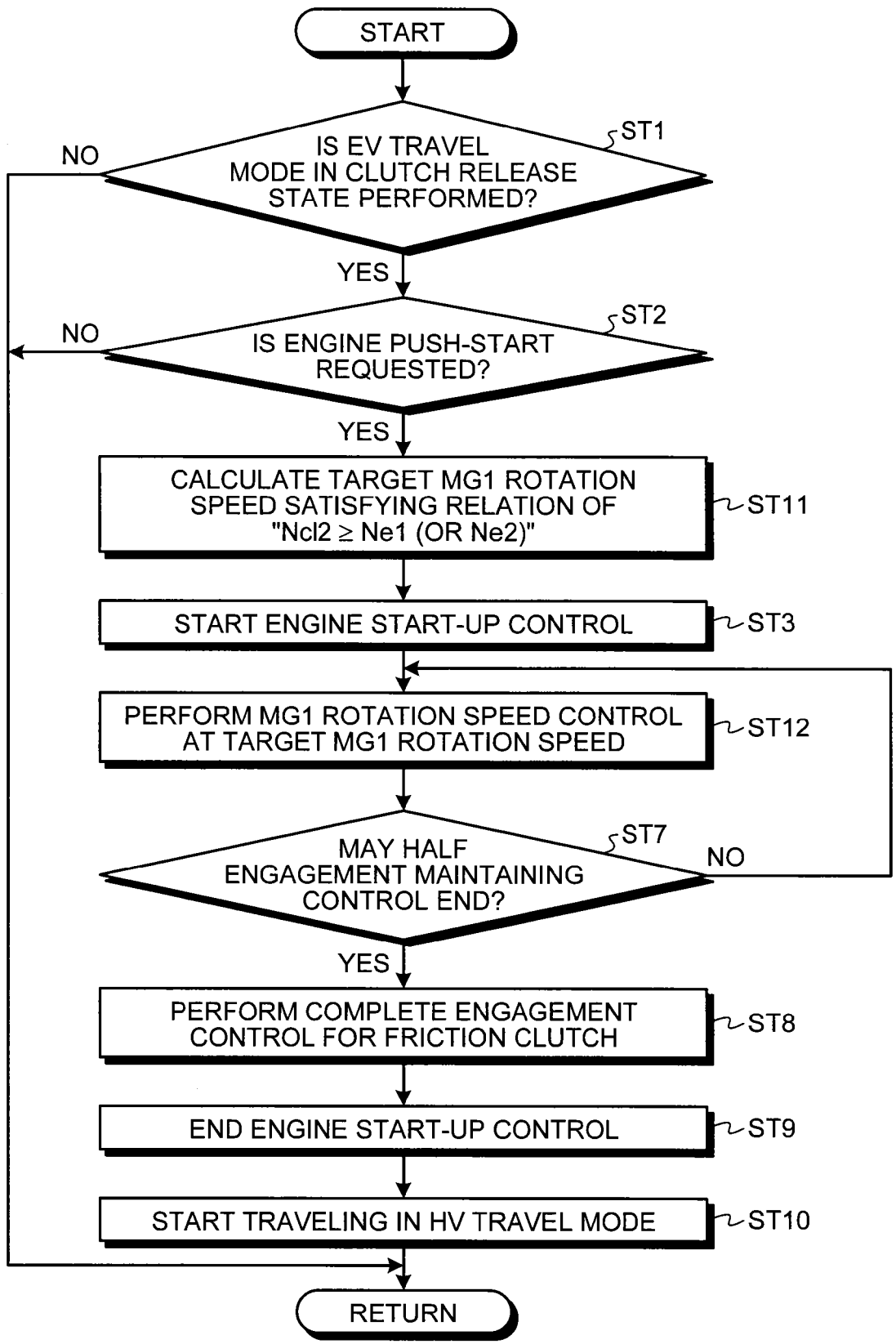
FIG. 10 is a flowchart illustrating an operation of switching the EV travel mode to the HV travel mode of the modified example.

Hereinafter, an operation of switching the EV travel mode in the clutch release state to the HV travel mode in the modified example will be described with reference to the flowchart of FIG. 10. Furthermore, the same calculation process as the embodiment is performed unless otherwise specified in "ST . . . " of FIG. 8.

When it is determined that the push-start of the engine ENG is requested in step ST2, the HVECU 50 of the modified example calculates the target MG1 rotation speed $Nmg1_{tgt}$ until the engine rotation speed Ne increases to the ignition permission rotation speed Ne1 or the engine ENG reaches the complete explosion from the start of the start-up control for the engine ENG (step ST11). As the target MG1 rotation speed $Nmg1_{tgt}$, the engine rotation speed Ne is calculated in which the second clutch rotation speed Ncl2 becomes the ignition permission rotation speed Ne1 or more or the complete explosion rotation speed Ne2 or more as described above.

The HVECU 50 starts the start-up control for the engine ENG (step ST3), and controls the MG1 rotation speed Nmg1 at the calculated target MG1 rotation speed $Nmg1_{tgt}$ (step ST12). Accordingly, in the hybrid system 100, the half engagement maintaining control for the friction clutch 40 starts along with the start-up control for the engine ENG.

The HVECU 50 determines whether or not the half engagement maintaining control may be ended (step ST7). In step ST7, when the target MG1 rotation speed $Nmg1_{tgt}$ until the engine rotation speed Ne increases to the ignition permission rotation speed Ne1 is calculated, it is determined whether or not the engine rotation speed Ne increases to the ignition permission rotation speed Ne1 or more. Further, when the target MG1 rotation speed $Nmg1_{tgt}$ until the engine ENG reaches the complete explosion is calculated, it is determined whether or not the engine ENG reaches the complete explosion.

When it is determined that the half engagement maintaining control may not be ended, the HVECU 50 returns the routine to step ST12 so as to continue the half engagement maintaining control. Meanwhile, when it is determined that the half engagement maintaining control may be ended, the HVECU 50 completely engages the friction clutch 40 (step ST8), ends the start-up control for the engine ENG (step ST9), and starts travelling in the HV travel mode (step ST10).

[Travel Mode Selection in High Vehicle Speed Travel State]

Figure 11:
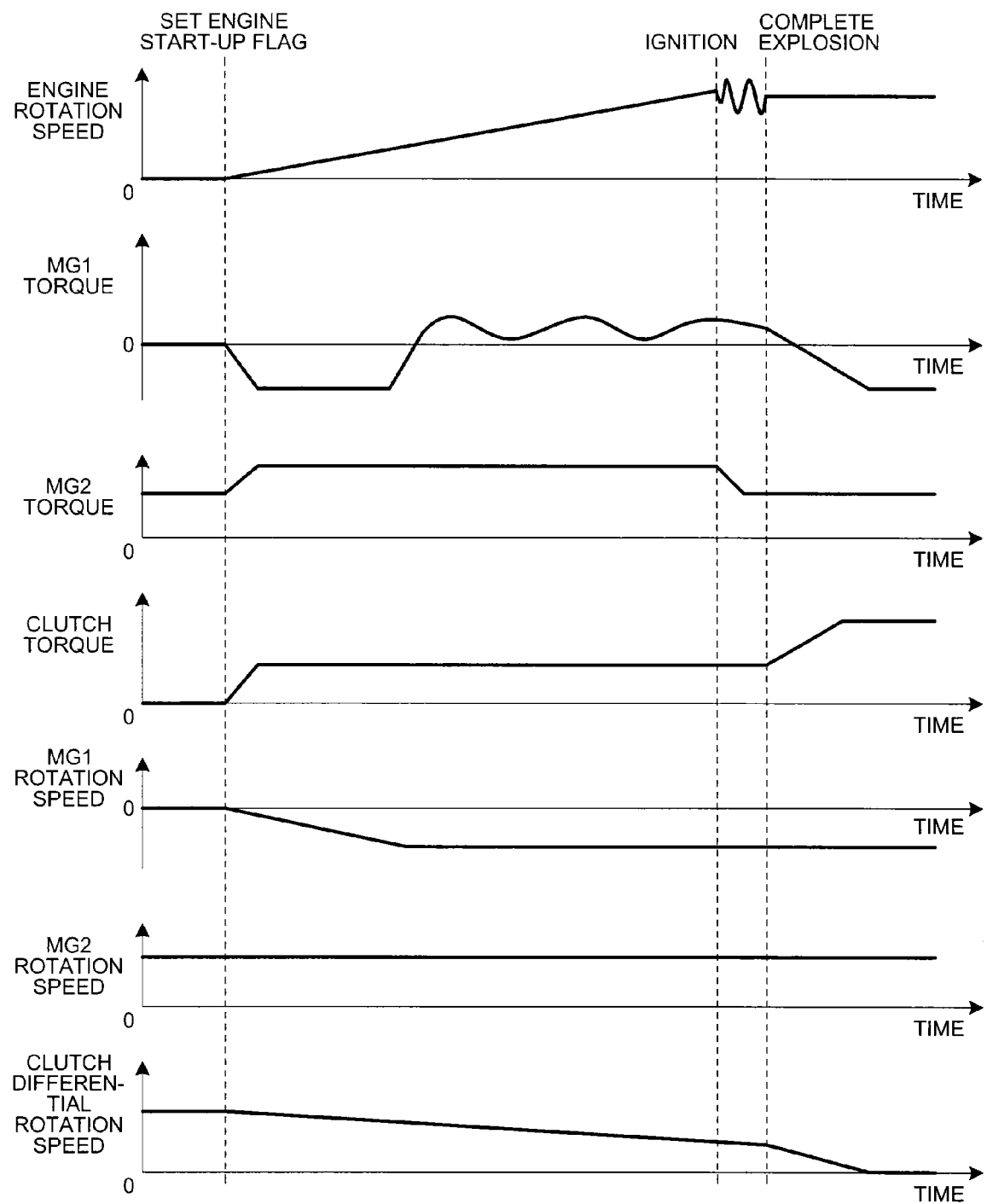
FIG. 11 is a time chart illustrating an operation of switching the EV travel mode to the HV travel mode at a high vehicle speed of the modified example.

Here, the selection of the travel mode in the high vehicle speed travel state of the modified example will be described based on the time chart of FIG. 11. At that time, the control for the second rotary machine MG2 or the control for the hydraulic pressure to be supplied of the friction clutch 40 is performed similarly to the high vehicle speed travel state of the embodiment.

When the push-start of the engine ENG is requested, the HVECU 50 calculates the target MG1 rotation speed $Nmg1_{tgt}$ from that time, and starts the start-up control for the engine ENG. In this example, the target MG1 rotation speed $Nmg1_{tgt}$ until the engine ENG reaches the complete explosion from the start of the start-up control for the engine ENG is calculated. The target MG1 rotation speed $Nmg1_{tgt}$ is calculated as a value in which the clutch differential rotation speed ΔNcl gradually decreases from the start of the start-up control for the engine ENG and the clutch differential rotation speed ΔNcl becomes higher than zero when the engine rotation speed Ne becomes the complete explosion rotation speed Ne2. The target MG1 rotation speed $Nmg1_{tgt}$ becomes a negative value in the high vehicle speed travel state, gradually increases from zero in the reverse rotation direction, and is maintained at a constant rotation speed.

When the start-up control for the engine ENG starts, the HVECU 50 gradually increases the MG1 rotation speed Nmg1 in the reverse rotation direction based on the target MG1 rotation speed $Nmg1_{tgt}$ and generates the negative MG1 torque Tmg1. Then, the HVECU 50 maintains the MG1 rotation speed Nmg1 at a constant rotation speed based on the target MG1 rotation speed $Nmg1_{tgt}$, and increases or decreases the MG1 torque Tmg1 switched from a negative value to a positive value. Accordingly, in the hybrid system 100, the engine rotation speed Ne increases while the clutch differential rotation speed ΔNcl gradually decreases.

In this example, the engine ENG is ignited when the engine rotation speed Ne becomes the ignition permission rotation speed Ne1. At this time, the clutch differential rotation speed ΔNcl is higher than zero, and the friction clutch 40 is maintained in the half engagement state. Then, when the engine ENG reaches the complete explosion, the HVECU 50 performs a control so that the friction clutch 40 becomes the complete engagement state while the MG1 rotation speed Nmg1 is maintained at a constant value based on the target MG1 rotation speed $Nmg1_{tgt}$ and the MG1 torque Tmg1 is switched from a positive value to a negative value. This is because the friction clutch 40 is maintained in the half engagement state even when the engine ENG reaches the complete explosion by the control for the first rotary machine MG1.

[Travel Mode Selection in Low Vehicle Speed Travel State]

Figure 12:
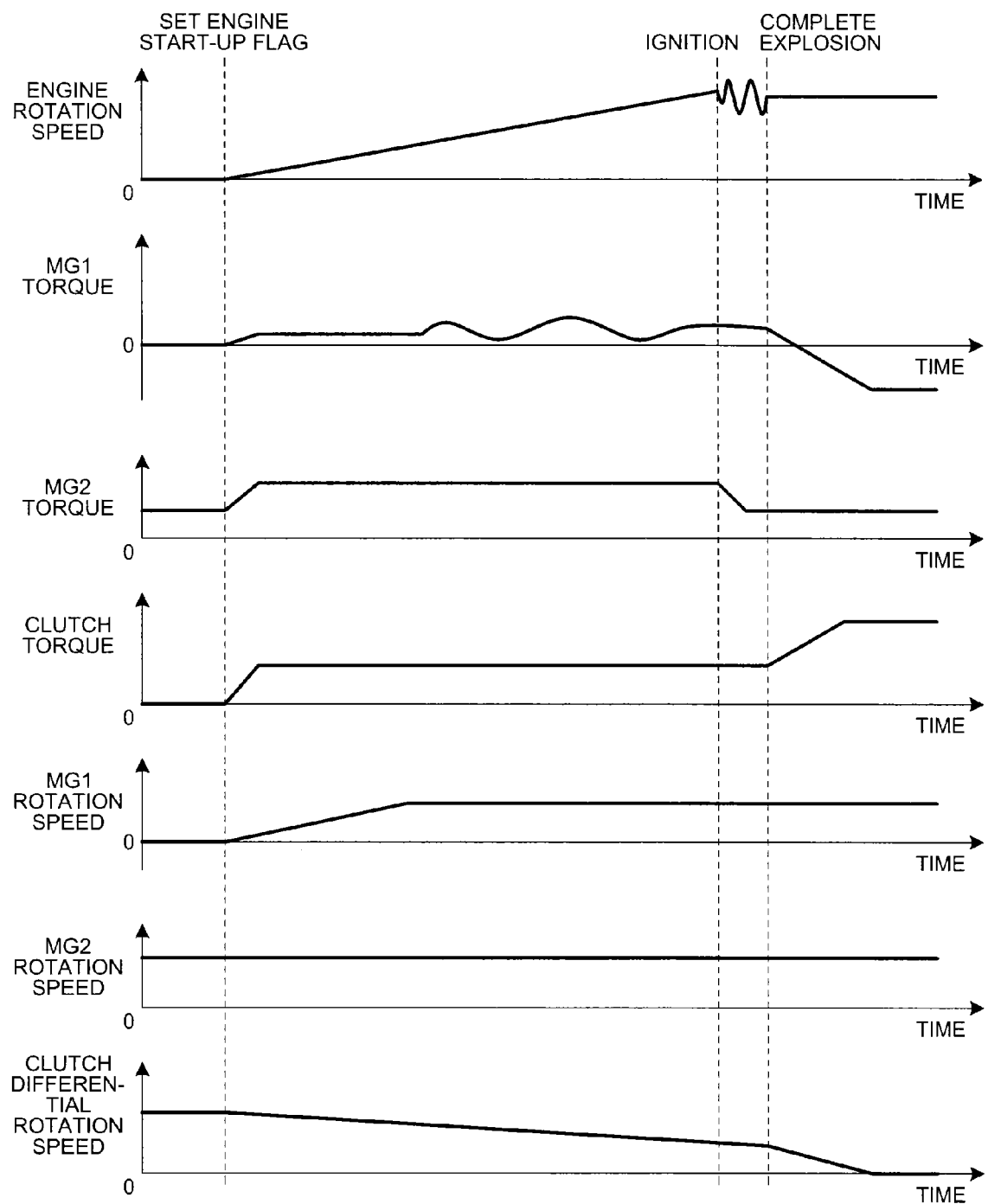
FIG. 12 is a time chart illustrating an operation of switching the EV travel mode to the HV travel mode at a low vehicle speed of the modified example.

Next, the selection of the travel mode in the low vehicle speed travel state of the modified example will be described based on the time chart of FIG. 12. At that time, the control for the second rotary machine MG2 or the control for the hydraulic pressure to be supplied of the friction clutch 40 is performed similarly to the high vehicle speed travel state of the embodiment.

When the push-start of the engine ENG is requested, the HVECU 50 calculates the target MG1 rotation speed $Nmg1_{tgt}$ (in this example, the target MG1 rotation speed $Nmg1_{tgt}$ until the engine ENG reaches the complete explosion from the start of the start-up control for the engine ENG) from that time, and starts the start-up control for the engine ENG. The target MG1 rotation speed $Nmg1_{tgt}$ is calculated as a value in which in which the clutch differential rotation speed ΔNcl gradually decreases from the start of the start-up control for the engine ENG and the clutch differential rotation speed ΔNcl becomes higher than zero when the engine rotation speed Ne becomes the complete explosion rotation speed Ne2. The target MG1 rotation speed $Nmg1_{tgt}$ becomes a positive value in the low vehicle speed travel state, gradually increases from zero in the normal rotation direction, and is maintained at a constant rotation speed.

When the start-up control for the engine ENG starts, the HVECU 50 gradually increases the MG1 rotation speed Nmg1 in the normal rotation direction based on the target MG1 rotation speed $Nmg1_{tgt}$ and generates the positive MG1 torque Tmg1. Then, the HVECU 50 maintains the MG1 rotation speed Nmg1 at a constant rotation speed based on the target MG1 rotation speed $Nmg1_{tgt}$ and increases or decreases the MG1 torque Tmg1 at a positive value. Accordingly, in the hybrid system 100, the engine rotation speed Ne increases while the clutch differential rotation speed ΔNcl gradually decreases.

In this example, the engine ENG is ignited when the engine rotation speed Ne becomes the ignition permission rotation speed Ne1. Then, when the engine ENG reaches the complete explosion, the HVECU 50 performs a control so that the friction clutch 40 becomes the complete engagement state while the MG1 rotation speed Nmg1 is maintained at a constant value based on the target MG1 rotation speed $Nmg1_{tgt}$ and the MG1 torque Tmg1 is switched from a positive value to a negative value. In this example, the clutch differential rotation speed ΔNcl is higher than zero and the friction clutch 40 is maintained in the half engagement state from the ignition of the engine to the complete explosion of the engine.

In this way, even in the modified example, the friction clutch 40 may be maintained in the half engagement state during the push-start of the engine in a manner such that the MG1 torque Tmg1 is controlled while the MG1 rotation speed Nmg1 is controlled at the predetermined target MG1 rotation speed $Nmg1_{tgt}$ at least until the engine rotation speed Ne increases to the ignition permission rotation speed Ne1 (Ne≥Ne1) or at least until the complete explosion of the engine ENG. Thus, the power transmission device 1 and the hybrid system 100 may have the same effect as the embodiment.

Further, in the modified example, since the half engagement maintaining control for the friction clutch 40 may be performed during the push-start of the engine without monitoring the clutch differential rotation speed ΔNcl as in the embodiment, there is no need to provide a sensor for detecting the clutch differential rotation speed ΔNcl. That is, the power transmission device 1 and the hybrid system 100 may easily and simply perform the half engagement maintaining control for the friction clutch 40 during the push-start of the engine while suppressing the cost thereof. However, in the power transmission device 1 and the hybrid system 100, the precision of the half engagement maintaining control may be improved by monitoring of the clutch differential rotation speed ΔNcl.

REFERENCE SIGNS LIST

1 POWER TRANSMISSION DEVICE
11 ENGINE ROTATION SHAFT
12 MG1 ROTATION SHAFT
13 MG2 ROTATION SHAFT
20 POWER DISTRIBUTION MECHANISM
21 FIRST DIFFERENTIAL DEVICE (FIRST PLANETARY GEAR DEVICE)
22 SECOND DIFFERENTIAL DEVICE (SECOND PLANETARY GEAR DEVICE)
31 TO 34 GEAR
40 FRICTION CLUTCH
41 FIRST ENGAGEMENT COMPONENT
42 SECOND ENGAGEMENT COMPONENT
50 HVECU (GENERAL ECU)
51 ENGECU
52 MGECU
53 CLUTCH ECU
100 HYBRID SYSTEM
C1, C2 CARRIER
ENG ENGINE
MG1 FIRST ROTARY MACHINE
MG2 SECOND ROTARY MACHINE
P1, P2 PINION GEAR
R1, R2 RING GEAR
S1, S2 SUN GEAR
W DRIVE WHEEL

The invention claimed is:

1. A power transmission device for a hybrid vehicle, comprising:
    a power distribution mechanism which includes a plurality of rotation components rotating in different rotation speeds and in which a rotation shaft of an engine, a rotation shaft of a first rotary machine, a rotation shaft of a second rotary machine, and a drive wheel are at least selectively connected to four rotation components among the rotation components;
    a friction engagement device which is interposed between the engine and the rotation component connected to the engine; and
    a control device which performs a stop control for the engine and a release control for the friction engagement device so as to cause the vehicle to travel only by the power of the second rotary machine and performs an engagement control for the friction engagement device while the vehicle travels only by the power of the second rotary machine so as to perform a push-start of the engine, wherein the control device controls the first rotary machine so that the friction engagement device is maintained in a half engagement state at a differential rotation speed higher than a predetermined rotation speed and ignites the engine in the half engagement state of the friction engagement device during the push-start of the engine.

2. The power transmission device for the hybrid vehicle according to claim 1, wherein in the control for the first rotary machine during the push-start of the engine, the rotation speed of the first rotary machine is controlled in a normal rotation direction.

3. The power transmission device for the hybrid vehicle according to claim 2, wherein the control device performs the control for the first rotary machine at least until the rotation speed of the engine increases to an ignition permission rotation speed of the engine or at least until a complete explosion of the engine.

4. The power transmission device for the hybrid vehicle according to claim 2, wherein the plurality of rotation components includes first and second planetary gear devices of which ring gears connected to the drive wheel rotate together, the rotation shaft of the engine and the rotation shaft of the first rotary machine are respectively connected to a carrier and a sun gear of the first planetary gear device, and the rotation shaft of the second rotary machine is connected to a sun gear of the second planetary gear device.

5. The power transmission device for the hybrid vehicle according to claim 1, wherein at a time a vehicle speed is equal to or higher than a predetermined vehicle speed during the push-start of the engine, the control device controls the friction engagement device in the half engagement state and controls the rotation speed of the first rotary machine in a reverse rotation direction, wherein at a time the vehicle speed is lower than the predetermined vehicle speed during the push-start of the engine, the control device controls the friction engagement device in the half engagement state and controls the rotation speed of the first rotary machine in the normal rotation direction, and wherein at a time the differential rotation speed of the friction engagement device decreases to the predetermined rotation speed after the control in the reverse rotation direction or the normal rotation direction, the control device controls the rotation speed of the first rotary machine in the normal rotation direction.

6. The power transmission device for the hybrid vehicle according to claim 5, wherein the control device performs the control for the first rotary machine at least until the rotation speed of the engine increases to an ignition permission rotation speed of the engine or at least until a complete explosion of the engine.

7. The power transmission device for the hybrid vehicle according to claim 5, wherein the plurality of rotation components includes first and second planetary gear devices of which ring gears connected to the drive wheel rotate together, the rotation shaft of the engine and the rotation shaft of the first rotary machine are respectively connected to a carrier and a sun gear of the first planetary gear device, and the rotation shaft of the second rotary machine is connected to a sun gear of the second planetary gear device.

8. The power transmission device for the hybrid vehicle according to claim 1, wherein the control device controls the first rotary machine at a target rotation speed of the first rotary machine in which the rotation speed of the rotation component connected to the engine becomes equal to or higher than an ignition permission rotation speed of the engine or a complete explosion rotation speed of the engine during the push-start of the engine.

9. The power transmission device for the hybrid vehicle according to claim 8, wherein the target rotation speed of the first rotary machine increases as the vehicle speed increases in the reverse rotation direction at a time a vehicle speed is equal to or higher than a predetermined vehicle speed, and wherein the target rotation speed of the first rotary machine increases as the vehicle speed decreases in the normal rotation direction at a time the vehicle speed is lower than the predetermined vehicle speed.

10. The power transmission device for the hybrid vehicle according to claim 9, wherein the control device performs the control for the first rotary machine at least until the rotation speed of the engine increases to the ignition permission rotation speed of the engine or at least until a complete explosion of the engine.

11. The power transmission device for the hybrid vehicle according to claim 9, wherein the plurality of rotation components includes first and second planetary gear devices of which ring gears connected to the drive wheel rotate together, the rotation shaft of the engine and the rotation shaft of the first rotary machine are respectively connected to a carrier and a sun gear of the first planetary gear device, and the rotation shaft of the second rotary machine is connected to a sun gear of the second planetary gear device.

12. The power transmission device for the hybrid vehicle according to claim 8, wherein the control device performs the control for the first rotary machine at least until the rotation speed of the engine increases to the ignition permission rotation speed of the engine or at least until a complete explosion of the engine.

13. The power transmission device for the hybrid vehicle according to claim 8, wherein the plurality of rotation components includes first and second planetary gear devices of which ring gears connected to the drive wheel rotate together, the rotation shaft of the engine and the rotation shaft of the first rotary machine are respectively connected to a carrier and a sun gear of the first planetary gear device, and the rotation shaft of the second rotary machine is connected to a sun gear of the second planetary gear device.

14. The power transmission device for the hybrid vehicle according to claim 1, wherein the control device performs the control for the first rotary machine at least until the rotation speed of the engine increases to an ignition permission rotation speed of the engine or at least until a complete explosion of the engine.

15. The power transmission device for the hybrid vehicle according to claim 14, wherein the plurality of rotation components includes first and second planetary gear devices of which ring gears connected to the drive wheel rotate together, the rotation shaft of the engine and the rotation shaft of the first rotary machine are respectively connected to a carrier and a sun gear of the first planetary gear device, and the rotation shaft of the second rotary machine is connected to a sun gear of the second planetary gear device.

16. The power transmission device for the hybrid vehicle according to claim 1,
wherein the plurality of rotation components includes first and second planetary gear devices of which ring gears connected to the drive wheel rotate together, the rotation shaft of the engine and the rotation shaft of the first rotary machine are respectively connected to a carrier and a sun gear of the first planetary gear device, and the rotation shaft of the second rotary machine is connected to a sun gear of the second planetary gear device.

* * * * *